United States Patent [19]

Hisada et al.

[11] Patent Number: 4,799,110
[45] Date of Patent: Jan. 17, 1989

[54] IMAGE SIGNAL CODING APPARATUS

[75] Inventors: Katsutoshi Hisada; Nobuaki Kokubu, both of Tokyo; Shigeki Sakurai, Yokohama; Yukio Murata, Kawasaki; Tatsuo Okano, Yokohama, all of Japan

[73] Assignee: Canon Kabushiki Kaisha, Tokyo, Japan

[21] Appl. No.: 888,493

[22] Filed: Jul. 23, 1986

[30] Foreign Application Priority Data

| Aug. 2, 1985 | [JP] | Japan | 60-170803 |
| Aug. 2, 1985 | [JP] | Japan | 60-170804 |
| Aug. 2, 1985 | [JP] | Japan | 60-170805 |
| Aug. 2, 1985 | [JP] | Japan | 60-170806 |
| Aug. 2, 1985 | [JP] | Japan | 60-170807 |
| Aug. 2, 1985 | [JP] | Japan | 60-170808 |
| Aug. 2, 1985 | [JP] | Japan | 60-170809 |
| Aug. 2, 1985 | [JP] | Japan | 60-170810 |

[51] Int. Cl.$^4$ ............................................. H04N 1/40
[52] U.S. Cl. ............................................. 358/261.3
[58] Field of Search ............................. 358/260, 261, 263; 340/347 DD

[56] References Cited

U.S. PATENT DOCUMENTS

| 4,543,612 | 9/1988 | Matsunaga et al. | 358/261 |
| 4,688,100 | 8/1987 | Hagamuma et al. | 358/261 |
| 4,701,803 | 10/1987 | Sato | 358/260 |

Primary Examiner—Edward L. Coles, Sr.
Attorney, Agent, or Firm—Fitzpatrick, Cella, Harper & Scinto

[57] ABSTRACT

An image signal coding apparatus includes reference and coding line change point detection circuits, reference line shift registers, a coding line shift register, a symbol detection circuit, coding and reference line ROM tables, and a code determination circuit. The coding line change point detection circuit receives a serial reference line image signal in synchronism with a serial coding line image signal. The reference line shift registers receive serial change point data in the reference line image signal and output parallel reference line change point data. The coding line shift register receives serial change point data in the coding line image signal and outputs parallel coding line change point data. The symbol detection circuit monitors output states of the reference and coding line shift registers. A run length counter counts the number of pixels between the change points in the coding line image signal. The ROM tables cooperate with the code determination circuit to code the coding line image signal in response to outputs from the symbol detection circuit and the run length counter.

45 Claims, 16 Drawing Sheets

FIG. 16

| INPUT ADDRESS | | OUTPUT | |
|---|---|---|---|
| A10 A9 A8 A7 A6 A5 A4 A3 A2 A1 A0 | O1~O16 | O17~O21 |
| 0 0 0 0 0 0 0 0 0 0 0 | WHITE 0 CODE | WHITE 0 CODE LENGTH |
| 0 0 0 1 1 1 1 1 1 1 1 | WHITE 63 CODE | WHITE 63 CODE LENGTH |
| 0 1 0 0 0 0 0 0 0 0 0 | BLACK 0 CODE | BLACK 0 CODE LENGTH |
| 0 1 0 1 1 1 1 1 1 1 1 | BLACK 63 CODE | BLACK 63 CODE LENGTH |
| 1 0 0 0 0 0 0 0 0 0 0 | 0 0 1 WHITE 0 CODE | WHITE 0 CODE LENGTH + 3 |
| 1 0 0 1 1 1 1 1 1 1 1 | 0 0 1 WHITE 63 CODE | WHITE 63 CODE LENGTH + 3 |
| 1 1 0 0 0 0 0 0 0 0 0 | 0 0 1 BLACK 0 CODE | WHITE 0 CODE LENGTH + 3 |
| 1 1 0 1 1 1 1 1 1 1 1 | 0 0 1 BLACK 63 CODE | BLACK 63 CODE LENGTH + 3 |
| 0 0 1 — — — — — — — — | EOL CODE | EOL CODE LENGTH |
| 0 1 1 — — — — — — — — | EOL + 1 CODE | EOL CODE LENGTH + 1 |
| 1 — 1 — — — — — — — — | EOL + 0 CODE | EOL CODE LENGTH + 1 |

IMAGE SIGNAL CODING APPARATUS

BACKGROUND OF THE INVENTION

The present invention relates to an image signal coding apparatus used in a facsimile system, and image electronic file, or the like.

In an image transmission system (e.g., a conventional facsimile system) or an image file system using a recent optical or magnetic disk, an image signal is coded to decrease the number of data signals, and data transmission and data storage (i.e., packetting) can be effectively performed at high speed.

For example, in a facsimile, MH (Modified Huffman) coding is known as a one-dimensional coding scheme; MR (Modified READ) coding, a two-dimensional coding scheme; and MMR (Modified Modified READ) coding, an efficient two-dimensional coding scheme.

The MH, MR, and MMR schemes have the following relationship. The MMR scheme includes techniques similar to those of the MH scheme, and is obtained by partially modifying the MR scheme.

Images to be coded and coding rules comply with T4 and T6 recommended by the CCITT (International Consultative Committee for Telephone and Telegraph).

The MMR scheme is described as an efficient two-dimensional coding scheme in a recommended communications system (Posts and Telecommunications No. 197) for Facsimile Group No. 4 Devices on page 52 and the subsequent pages, in the Official Gazette (Extra No. 29) dated Mar. 22, 1985.The MH scheme is described as a one-dimensional coding scheme and the MR scheme as a two-dimensional coding scheme both in Notification No. 1013 of the Ministry of Posts and Telecommunications, 1981.

Among the coding schemes described above, the MR and MMR schemes utilize a correlation between an image signal of a given line and an image signal of the immediately preceding line to code the image signal of the given line. Correlation discrimination requires complex processing. This processing is performed by software processing using a microcomputer or the like. Software processing requiring several steps to discriminate the correlation has an upper limit to its coding speed. An original image is photoelectrically read to produce an image signal. The image signal is temporarily stored in a large-capacity memory. The image signal is then read out and coded in synchronism with a coding operation. It is therefore difficult to code an image signal output such as a read image signal without delay, i.e., on a real-time basis.

In addition, since the coding operation is performed in a code corresponding to a correlation discrimination result, it is difficult to obtain an image signal by photoelectrically reading an original image without delay.

In order to represent a relatively long run length in a horizontal mode according to the MMR scheme, a plurality of coding codes are required. If these coding codes are generated after mode discrimination, the coding operation speed is lower than the image signal input speed. Therefore, it is difficult to perform a real-time coding operation.

When the coding operation is performed after correlation discrimination, pixels preceding and succeeding an input pixel must be monitored. In order to synchronize the coding operation with the image signal input, coding must be performed as soon as the correlation discrimination is completed.

In image signal coding using the MH, MR, and MMR schemes, the number of succeeding pixels of image signals representing an identical color, that is, a run length, must be represented by a code. More specifically, a run length is represented by a terminating code representing one of run lengths of 1 to 63, and a make-up code representing one of run lengths of 64, 128, 192, ..., 64x M, ..., 2560. Therefore, in order to express a relatively long run length, a plurality of codes are required. However, if these codes are simultaneously generated, a coding circuit is overloaded and requires a long processing time.

The MH, MR, and MMR schemes are selectively used according to the type of subsequent processor used for processing the coded image signal. If the subsequent processing format is changed, a circuit modification is required to be compatible with the format change, thus degrading coding efficiency. Since the three coding schemes are related to each other, as described above, demand has arisen for using these three coding schemes in a single coding apparatus.

SUMMARY OF THE INVENTION

It is an object of the present invention to code an image signal at high speed in synchronism with input of an image signal to be coded.

It is another object of the present invention to parallel-process a serial input image signal to achieve real-time coding without being delayed from an image signal input and without using a large-capacity memory or the like.

It is still another object of the present invention to simultaneously generate coding codes in each mode during coding and selectively output these codes according to a priority order, so that optimal coding codes can be output at the end of mode discrimination and coding can be performed without being delayed from the image signal input.

It is still another object of the present invention to immediately generate coding codes as soon as a mode is determined in coding using a plurality of modes, thereby achieving high-speed, real-time coding.

It is still another object of the present invention to input and code an image signal having pixels necessary for coding, thereby properly coding the input signal in synchronism with the image signal input.

It is still another object of the present invention to prestore predicted coding codes and to read out the prestored coding codes, so that a coding load at a code output timing can be reduced and the input image signal can be coded without being delayed from the image signal input.

It is still another object of the present invention to generate a mode identification code and the immediately succeeding coding code so as to constitute an integral code, thereby shortening an output time compared with the case wherein a plurality of codes are output, and hence coding the input image signal without being delayed from the image signal input.

It is still another object of the present invention to separately output a plurality of codes for a single pixel, thereby reducing the coding load and performing efficient coding.

It is still another object of the present invention to use a plurality of coding schemes in a single coding apparatus and to achieve coding suitable for a subsequent processor without greatly modifying the circuit arrangement.

The above and other objects, features, and advantages of the present invention will be apparent from the following detailed description in conjunction with the accompanying drawings.

BRIEF DESCRIPTION OF THE DRAWINGS

FIG. 16 is a data format showing contents of the ROM table C in FIG. 15;

DETAILED DESCRIPTION OF THE PREFERRED EMBODIMENT

Figure 1:
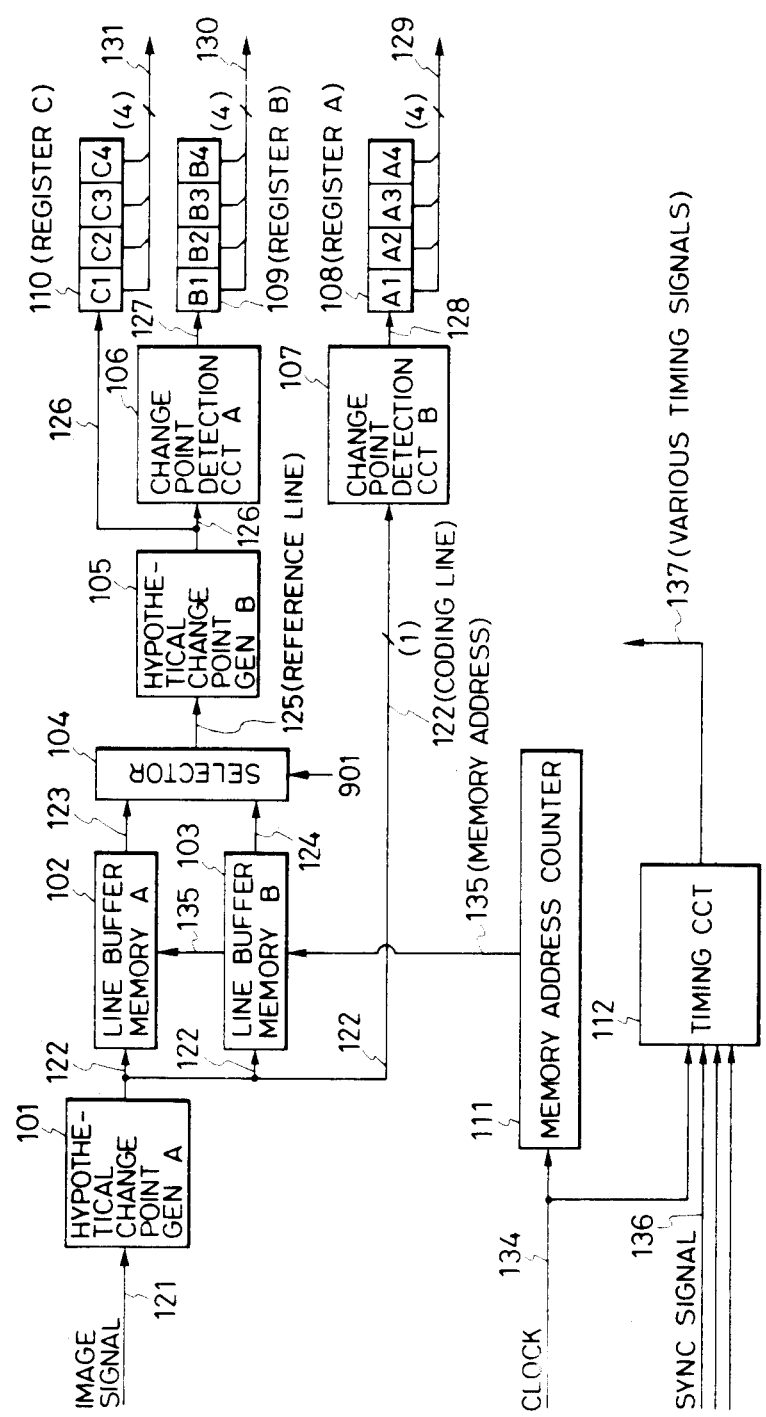
FIGS. 1 and 2 are block diagrams of a coding apparatus which employs the present invention.
Figure 2:
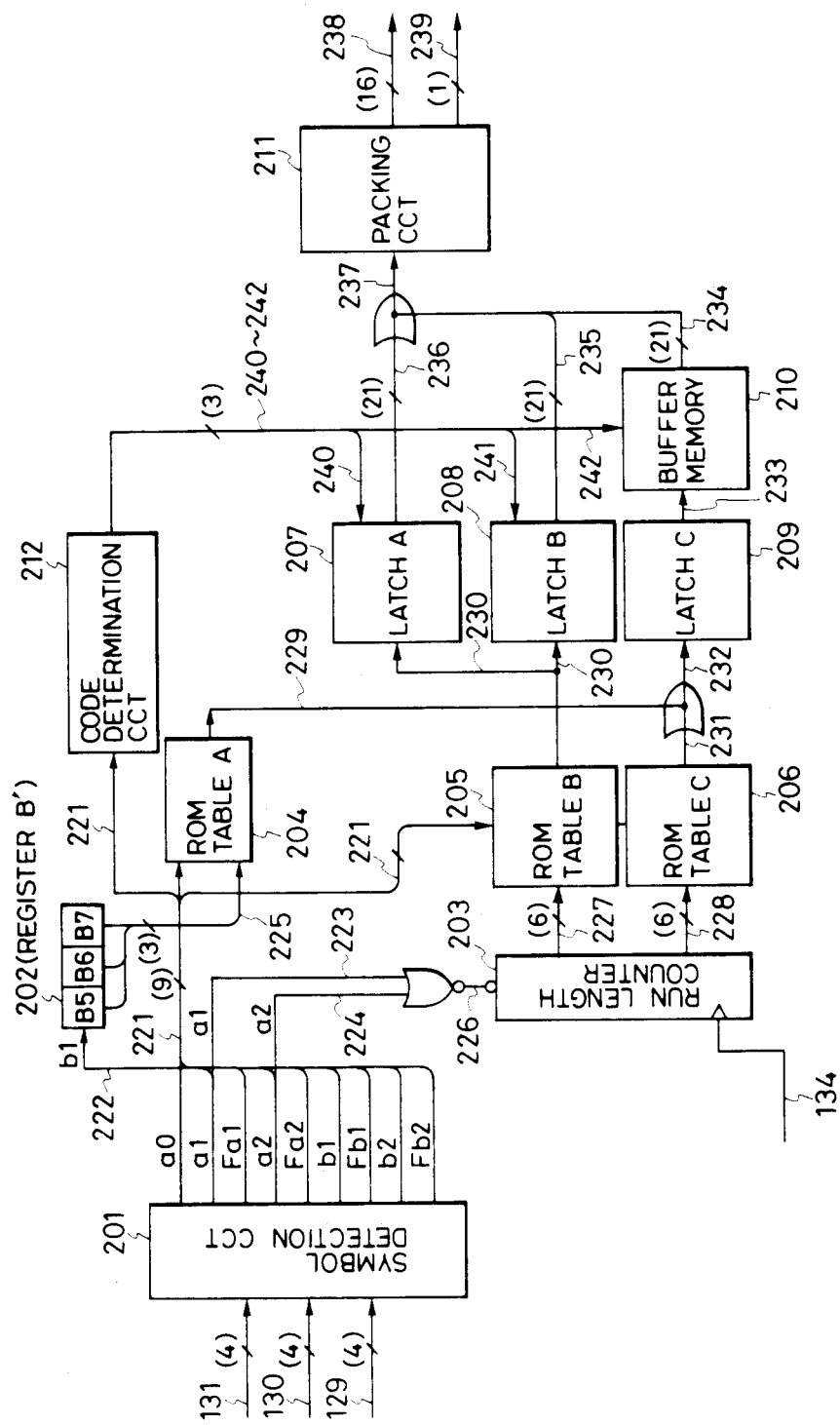

FIGS. 1 and 2 are block diagrams showing the arrangement of a coding circuit employing the present invention. The operation of the coding circuit will then be described with reference to FIGS. 1 to 5.

Referring to FIG. 1, a signal 121 is an image signal to be coded. The image signal is supplied from an external device such as an image scanning device, an image file, or a computer. The image signal is binary serial data represented by "0"s and or "1"s (e.g., "0" for a white pixel and "1" for a black pixel). A clock 134 is supplied from the external device in synchronism with input of the image signal 121. Each pixel is timed by each clock. Sync signals 136 include vertical and horizontal sync signals representing the horizontal and vertical periods of the image signal 121.

In this embodiment, the image signal 121 to be coded is given as a scanning image signal of a serial image signal for each main scanning line, in the same manner as a signal supplied to a laser printer or the like.

A circuit 101 forcibly generates a change point such that a pixel (i.e., a hypothetical pixel) next to the final pixel of the real image on a coding line (one main scanning line of the image to be coded) is the change point. The circuit 101 is referred to as a "hypothetical change point generator A" 101. The hypothetical change point generator A has an arrangement which does not change the real image on the coding line.

A line buffer memory A 102 and a line buffer memory B 103 are connected to the output of the hypothetical change point generator A 101. The memories A 102 and B 103 comprise RAMs (Random Access Memory) which are independently subjected to read write access. Each of the memories A 102 and B 103 has a capacity (the number of main scanning lines) for storing a binary image on one coding line.

The line buffer memory A 102 performs a write operation while the line buffer memory B 103 performs a read operation, and vice versa. In other words, the two line buffer memories constitute a double buffer memory.

A memory address counter 111 counts clocks 134, the number of which corresponds to the number of pixels of the coding line. The count of the counter 111 is commonly supplied as a memory address signal 135 to the line buffer memories A 102 and B 103. The count of the memory address counter 111 is reset to an initial value for each coding line and repeats counting. The binary image of each line written in each line buffer memory is read out in units of pixels according to the pixel positions of the image signal 121 of a new input line.

A selector 104 supplies a select signal 901 to one of the line buffer memories A 102 and B 103 so as to select the buffer memory in the read mode, thereby obtaining the readout data. The data selected by the selector 104 is supplied to the next stage as a reference line 125, i.e., a coding line reference data (an image).

A circuit 105 forcibly generates a change point such that a pixel (i.e., a hypothetical pixel) next to the final pixel of the real image on the coding line (one main scanning line of the image to be coded) is the change point. The circuit 105 is referred to as a "hypothetical change point generator B" 105. The hypothetical change point generator B 105 has an arrangement which does not change the real image on the coding line.

A circuit 106 detects a pixel serving as a change point among the real line and a hypothetical pixel on the reference line. The circuit 106 is referred to as a "change point detection circuit A" 106.

A circuit 107 detects a pixel serving as a change point amount the real line and a hypothetical pixel on the coding line. The circuit 107 is referred to as a "change point detection circuit B" 107.

A register A 108, a register B 109, and a register C 110 respectively comprise 4-bit shift registers.

A signal 126 represents the real image and a hypothetical pixel on the reference line. A signal 127 is a change point signal for the real image and a hypothetical pixel on the reference line. A signal 128 is a change point signal for the real image and a hypothetical pixel on the coding line.

A timing circuit 112 receives the clocks 134 and the sync signals 136, and generates various timing signals 137 on the basis of the input signals so as to time the respective circuit blocks.

Figure 4:
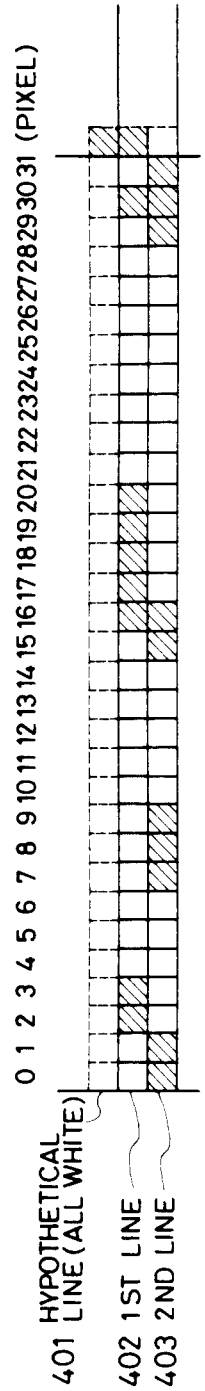
FIGS. 4, 5, and 6 are schematic views for explaining a relationship between a reference line and a coding line.

The operation of the circuit block in FIG. 1 will be described when an actual image (i.e., an image to be coded) in FIG. 4 is given and coded according to the MMR (Modified Modified READ) scheme.

For the sake of simplicity, in the image of FIG. 4, one line consists of 32 pixels (the number of main scanning lines=32) and two lines (the number of subscanning lines=2) constitutes one page.

Figure 5:
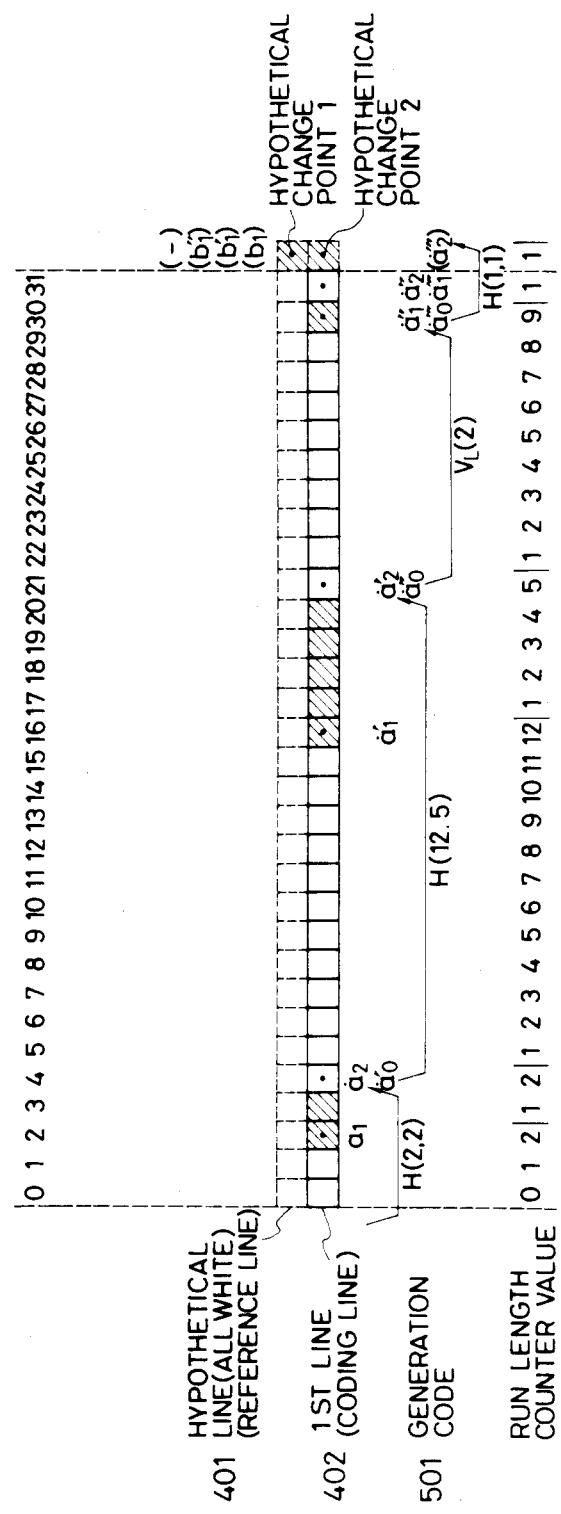

In order to actually code a first line 402 in FIG. 4, a hypothetical line 401 is defined as a reference line, and the first line 402 is defined as a coding line, as shown in FIG. 5.

Figure 6:
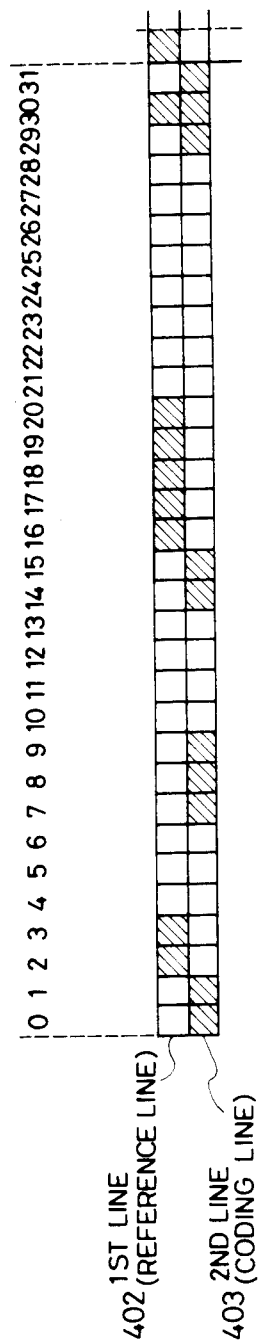

In order to code a second line 403 in FIG. 4, the first line 402 is defined as the reference line, and the second line 403 is defined as the coding line, as shown in FIG. 6.

Even if one page includes three or more main scanning lines, i.e., . . . the 3rd line, the 4th line, . . . , the relationship between the reference line and the coding line is updated to continue coding regardless of the number of subscanning lines.

Figure 3:
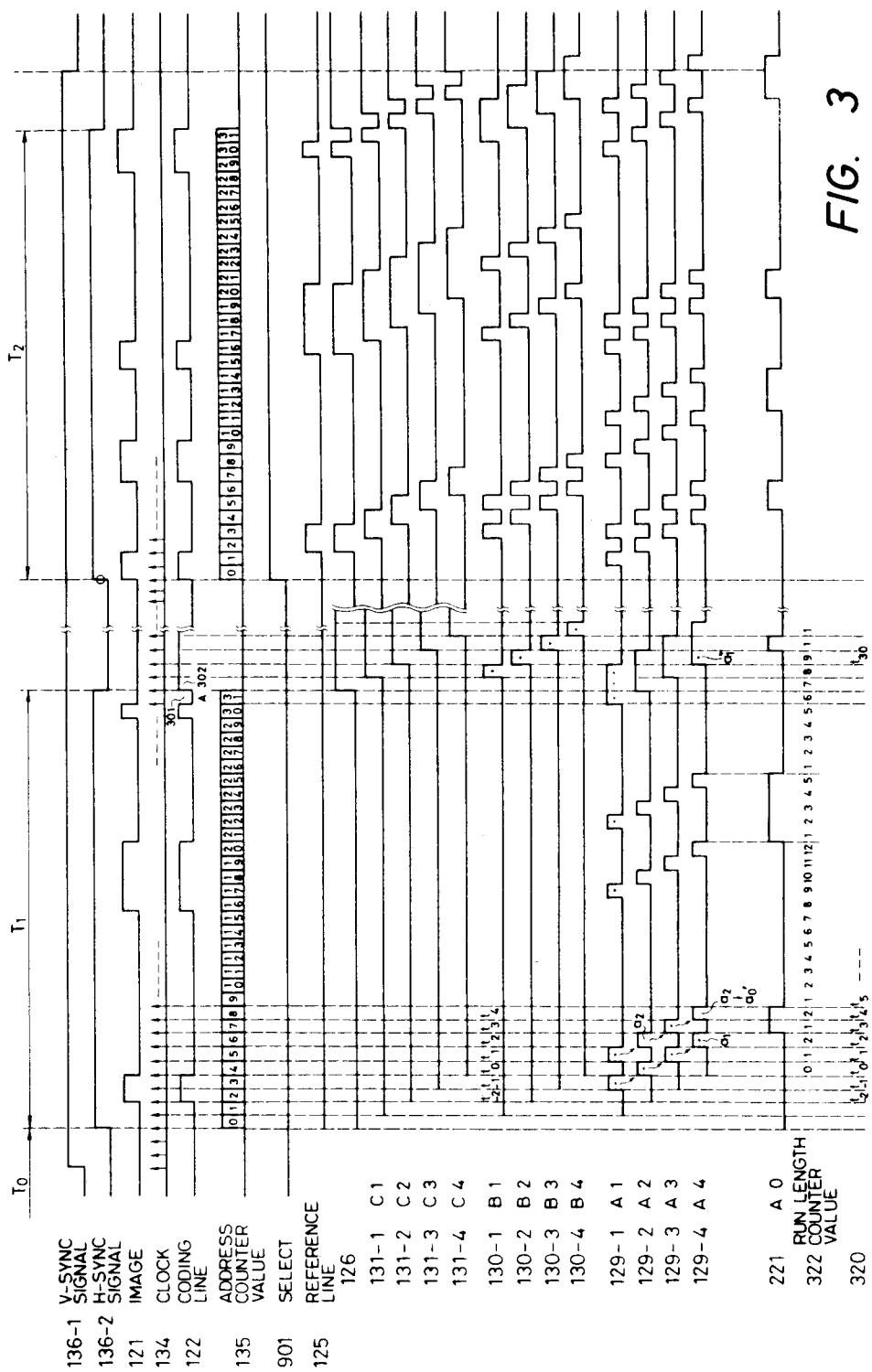
FIG. 3 is a timing chart for explaining the operation of the apparatus in FIGS. 1 and 2.

FIG. 3 is a timing chart for explaining the operation of the circuit block in FIG. 1 when the image in FIG. 4 is supplied thereto.

Referring to FIG. 3, a vertical sync (V-SYNC) signal 136-1 represents a period of an image along the subscanning direction, that is, the input period of a one-page image. A horizontal sync (H-SYNC) signal 136-2 represents a period of the image along the main scanning line, that is, the input period of a one-line image. The clocks 134 serve as image clocks. The image signal 121 in FIG. 3 is expressed as a signal waveform of the image signal to be coded (FIG. 4), and has high level, i.e., "1", for black pixels and low level, i.e., "0", for white pixels. In the image in FIG. 3, an image component for a period T1 is a real image on the first line 402 (FIG. 4), and an image component for a period T2 is a real image on the second line 403 (FIG. 4).

The hypothetical line 401 in FIG. 4 represents an upper margin of a printing sheet or an area outside the sheet. According to the MMR scheme, the hypothetical line 401 is assumed to be an all white line (i.e., all pixels in one line are white pixels). Therefore, the hypothetical line 401 in FIG. 4 does not appear in the image signal 121 in FIG. 3.

FIG. 5 is a timing chart for explaining coding operation for the first line 402, particularly showing the relationship between the hypothetical line 401 as the reference line and the first line 402 as the coding line.

When the image on the first line 402 in FIG. 5 is supplied to the hypothetical change point generator A 101, a hypothetical change point (a hypothetical pixel) 302 is added to the image, as indicated by 122 (a coding line) in FIG. 3. The real image for the period T1 is unchanged. The last pixel 301 on the first line has an opposite logic level (i.e., white to black) to the next pixel 302. The hypothetical pixels following the hypothetical change point (the hypothetical pixel) 302 have the same level as that of the hypothetical change point (the hypothetical pixel) 302 so as to prevent them from being the change points, for a reason to be described later.

The coding line signal 122 in FIG. 3 is input as an image signal to be coded to the change point detection circuit B 107, as shown in FIG. 1. The coding line signal 122 is also supplied as write data to the line buffer memories A 102 and B 103.

The address counter 111 counts the image clocks 134 for only the period T1, and outputs a count value 135 in FIG. 3. The count output is commonly supplied as a memory address signal 135 to the line buffer memories A 102 and B 103.

If the line buffer memories A 102 and B 103 are respectively set in the write and read modes, data for the coding line 122 is written at an address of the line buffer memory A 102 in response to the memory address signal 135. If all "0"s are written in the line buffer memory B 103 set in the read mode, "0"s are sequentially read out at addresses accessed by the memory address signal 135 and serve as a readout signal B represented by 124 in FIG. 1. The readout signal B 124 is selected by the selector 104 and serves as data for the reference line 125.

A data signal waveform 125 in FIG. 3 represents the reference line data. "0"s are thus set for the period T1. As shown in FIG. 5, the hypothetical line 401 is obtained as the "all white" reference line.

The coding line signal 122 is also supplied to the change point detection circuit B 107, as previously mentioned. The detection circuit B 107 detects the change point (i.e., a pixel) in the data input supplied thereto. The change point pixel is output as data of "1". Other pixels which do not serve as the change point are output as data of "0". This output corresponds to the output 128 in FIG. 1.

The hypothetical change point generator B 105 and the change point detection circuit A 106 perform the same operation as in the generator 101 and the detection circuit 107 for the coding line signal 122. However, the generator B 105 and the detection circuit A 106 are arranged for the reference line signal 125.

The reference line signal 125 is converted by the hypothetical change point generator B 105 into a signal obtained by adding a hypothetical pixel, having a color different from that of the last pixel, to the last pixel.

The signal 128 output from the change point detection circuit B 107 is sequentially shifted in the register A 108 in response to the clocks 134. Symbols A1 to A4 in the register A 108 represent four parallel bits. The parallel 4-bit output is normally output. The output signal waveforms of the register A 108 are shown as waveforms 129-1 to 129-4 in FIG. 3, respectively. When the pixel of interest on the coding line is shifted as an output A4 of the register A 108, whether a change point is present in 3-pixel data following the pixel of interest can be determined by an output 129.

The registers B 109 and C 110 generate outputs 130-2 to 130-4 and 131-1 to 131-4 in FIG. 3, respectively. More specifically, the registers B 109 and C 110 respectively store the change point signal and the color signals of the reference line corresponding to the pixel position data stored in the register A 108. If the output A4 of the register A 108 is the pixel of interest of the coding line, whether a change point is present in 3-pixel data following the pixel of interest of the reference line is determined by the registers B 109 and C 110. In addition, the color (i.e., the logic level) of the 3-pixel data can also be determined.

When the second line 403 in FIG. 4 is input as the image signal 121 to code the second line, the line buffer memories A 102 and B 103 are respectively set in the write and read modes. In other words, the first line 402 written in the line buffer memory B 103 during coding of the first line 402 serves as the reference line. The second line 403 then serves as the coding line. The same operation as for the first line is then performed.

The respective signal waveforms during the input of the second line 403 appear for a period T2 in FIG. 3. In this case, data of the reference line signal 125 for the period T2 is the first line 402 data written in the line buffer memory A 102 for the period T1.

The detailed operation of the circuit block in FIG. 1 has been described above.

A circuit block in FIG. 2 will be described below.

A symbol detection circuit 201 receives the signals 129, 130, and 131 from the registers A, B and C (FIG. 1) and detects necessary symbols a0, a1, a2, b1, b2, and the like according to MMR coding. These symbols are defined as follows:

a0 = the coding start pixel on the coding line
a1 = the first change point (pixel) to the right of the pixel a0 on the coding line
a2 = the first change point (pixel) to the right of the pixel a1 on the coding line
b1 = the first change point (pixel) to the right of the pixel a0 on the reference line, wherein the pixel b1 has a color opposite to that of the pixel a0
b2 = the first change point (pixel) to the right of the pixel b1

The "right" direction here means to the right of pixels in FIG. 4.

A register B′ 202 comprises a 3-bit shift register and receives the change point signal b1 202 in FIG. 2 and sequentially shifts the input data in response to the clocks 134. The change point signal b1 detected by the symbol detection circuit 201 is maintained for the next 3-clock period so that the position of the change point signal b1 with respect to the pixel of interest is determined.

A run length counter 203 comprises a binary counter for counting the number of pixels (i.e., a run length) from the pixel a0 to the pixel a1, or the number of pixels from the pixel a1 to the pixel a2. The run length counter 203 generates a maximum of a 12-bit output and thus can count up to 2559 (decimal).

A signal 228 in FIG. 1 represents the lower six bits of the count value output from the counter 203. A signal 227 in FIG. 2 represents the upper six bits of the count value output from the run length counter 203.

A ROM table A 204 mainly stores pass mode (P-mode) and vertical mode (V-mode) codes and the numbers of bits (code lengths) of these codes. The ROM table A 204 generates a parallel output consisting of the code and the code length in response to an address signal.

A ROM table B 205 mainly stores horizontal mode (H-mode) make-up codes and their length data. The signal 227 is used as an address signal to read out the corresponding code and its length data from the ROM table B 205.

A ROM table C 206 mainly stores H-mode terminating codes and their length data. The signal 228 is used as an address signal for the ROM table C 206 to read out the corresponding code and its length data.

Latches 207 and 208 temporarily store the make-up codes and their length data read out from the ROM 205. A latch 209 temporarily stores the terminating code and its length data read out from the ROM table C 206.

A buffer memory 210 sequentially receives the codes and their length data from the latch 209 and temporarily stores them.

The MMR coding rules will be described in more detail. The symbols a0, a1, and a2 defining according to MMR coding are located on the coding line. The symbols b1 and b2 are located on the reference line. The coding mode is solely selected from the following three modes according to the relative positional relationship (i.e., a distance) between the group of the symbols a0, a1, and a2 and the group of the symbols b1 and b2.

(1) Pass Mode (P-Mode)

The P-mode is selected if the pixel b2 is located to the left of the pixel a1 (only one code is generated).

(2) Vertical Mode (V-Mode)

The V-mode is selected if condition $|a1b1| \leq 3$ is satisfied (seven codes for different distances are used).

(3) Horizontal Mode (H-mode)

The H-mode is selected in the cases excepting those using the P- and V-modes (Coding is performed according to a run length code table ) and provides a coding format as follows:

$$H + M(a0a1) + M(a0a1)$$

where H is the code representing the H-mode, $M(a0a1)$ is the run length code of white or black $|a0a1|$, and $M(a1a2)$ is the run length code of black or white $|a1a2|$.

If at least two modes can be selected, the priority order of the modes (1), (2) and (3) is given as follows:

(1) P-mode > (2) V-mode > (3) H-mode

The priority order is determined by a code determination circuit 212. The circuit 212 selects the latches 207 and 208 and the buffer memory 210.

Coding of the first line (image) 402 in FIG. 4 will be described.

In this coding, the coding start time is given as time t0 along a time base 320 in FIG. 3.

At time t0, the start pixels of the reference and coding lines appear as a C4 output of the register C 110 (FIG. 1) and the A4 output of the register A 108, respectively. More specifically, at time t0, the outputs from the registers C 110, B 109, and A 108 are parallel outputs of the start pixels of the reference and coding lines, and of the subsequent 3-pixel signals. The pixel a0 is set to be the initial value "0" (white pixel = hypothetical) as indicated by A0 (a0) of 221 in FIG. 3.

The run length counter 203 starts counting the image clocks 134 from the initial value "0" at time t0.

The counter 203 outputs count value outputs 322 at the respective times in FIG. 3.

At time t0, the signal 129-4 is not set at logic "1" in FIG. 3. In other words, no change point is present in the A4 output of the register A 108 in FIG. 2. Similarly, no change point is present in a B4 output of the register B 109. Therefore, a code need not be generated, and the count of the run length counter 203 is incremented by one. In other words, at time t1, the state is the same as that at time t0.

At time t2, the signal 129-4 is set at logic "1". The A4 output of the register A 108 is set at logic "1" so that a change point is present at the corresponding position of the coding line. Since this change point is the first change point to the right (corresponding to the subsequent time) of the current start pixel a0, the change point is detected by the symbol detection circuit 201 (FIG. 2) to be the symbol a1. The detection state of the symbol a1 is stored as Fa1 in the symbol detection circuit 201.

At time t2, all the signals 130-1 to 130-4 in FIG. 3 are not set at logic "1", signifying that no change point b1 is present on the reference line for a three-clock period from time t2. When the symbol detection circuit 201 detects the pixel b1, the pixel b1 is shifted in the register B' 202 and enabled for the three-clock period. It should be noted that the symbol detection circuit 201 also includes a circuit for storing information that the pixel b1 has already been detected.

In this case, the symbol detection circuit 201 determines that the change point pixel b1 is not present within the three pixels adjacent to the change point pixel a1, and that the change point pixel b1 is not present from the start point pixel a0 to the pixel a1 (and therefore, the pixel b2 is not present either). Although the pixel a1 is detected at time t2, the conditions for the P-mode (the pixel b2 must be detected) and the V-mode ($|a1b1| \leq 3$) are not satisfied. Therefore, the H-mode is set.

The count of the run length counter 203 represents the number of pixels from the pixel a0 to the pixel a1, as indicated by the run length counter value 322 in FIG. 3 and is "2". The color of the run length is kept at the initial value "0" (=white). The run length value and the pixel color, which are represented by the output from the run length counter 203 and the like, are supplied to the ROM table C 206. The corresponding code and the code length data are read out from the ROM C 206. In this case, a "white run length 2" code is output. That is, $M(a0a1) =$ white 2.

This code is detected as the first code in the H-mode. A code "001" representing the H-mode and "white run 2" code "0111" are simultaneously output in response to one clock. At the same time, the code length data is output as binary data.

The count of the run length counter 203 is set to the initial value "1" (note that the initial value is not "0"). The run length counter 203 starts counting the pixels from the pixel a1 to the pixel a2. Setting for the initial value (i.e., the pixel a1) is prepared at time t2, the initial value is set in the counter, and the counter is enables at time t3. From this t3, the color of A0 is reversed (i.e., time t2="0" to time t3="1"). Upon the lapse of time tn, the A4 output of the register A 108 is set at logic "1" to detect a change point at time t4. Since the symbol detection circuit 201 stores that the change point a1 has already passed (i.e., Fa1=1), the detection circuit 201 determines that the change point represented by the A4 output described above is the pixel a2, the detection state of the pixel a2 is stored as Fa2 in the symbol detection circuit 201. At time t4, the count of the run length counter 203 is "2", and A0="1" (=black). Since the H-mode is set at time t2, the states of the reference line, i.e., the signals 131-1 to 131-4 and the signals 130-1 to 13-4 in FIG. 3 need not be checked upon detection of the pixel a2. Even if the pixels b1 and b2 are present on the reference line, although this is not the case, these pixels are neglected.

The code and the code length data of $M(a1, a2) =$ black "2" is output in the same manner as in $M(a0, a1)$. However, unlike in the case of $M(a0, a1)$, the code "001" representing the H-mode is not added.

After time t4, i.e., at time t5, the count of the run length counter 203 is set to be the initial value "1". In addition, A0 (=a0) is reversed, The change point a2 at time t4 is regarded as the start point pixel a0 in the next mode.

A code 501 obtained by coding the first line 402 is shown in FIG. 5.

At time t30 in FIG. 3, the count of the run length counter is "9". In this case, the symbol a1'' (=a1) is detected. A change point pixel b1'', two pixels after the symbol a1'' on the reference line, is detected according to the output 130-2 of the register B 109 (FIG. 3) and the output 131-2 of the register C 110 at time t30. Since condition $|a1b1| \leq 3$ is satisfied and the P-mode is not set (b2 is required), the V-mode is set. A VL (2) code (the pixel a1 is located to the left of the pixel b1 by two pixel positions) is output.

In this case, although the state is given such that the "run length white 9" code in the H-mode can be generated, the V-mode is an effective code according to the definition of the priority order of the modes. The H-mode code is thus disabled. Upon generation of the V-mode code, the count of the run length counter 203 up to time t30 is cleared so that the run length counter 203 is set to be initial value "1". After the V-mode code is generated, the color of the start point pixel a0 signal is reversed. It should be noted that the V-mode code is generated simultaneously (i.e., at time t30) with detection of the change point of the a1 signal.

Although omitted in the above description, if the symbol b1 is detected prior to detection of the signal a1, the detection signal for the symbol b1 is supplied to and shifted in the register B' 202. For the subsequent three-clock period, the outputs of the register B' 202 are sequentially shifted in the order of B5, B6, and B7. Thereafter, the outputs are disabled. If no code is generated even after the symbol b1 is detected in the B4 output of the register B 109, this fact is stored as an output Fb1 in the symbol detection circuit 201.

The functional blocks of the circuit block in FIG. 1 will be described in detail.

Figure 7:
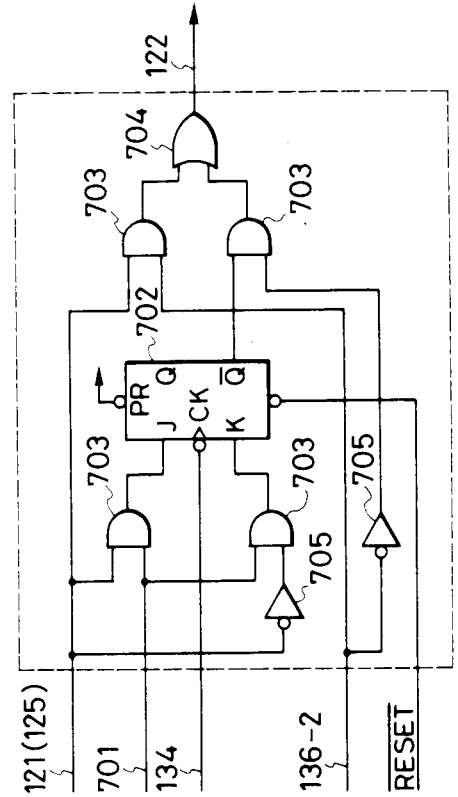
FIG. 7 is a circuit diagram of a hypothetical change point generator in FIG. 1.
Figure 8:
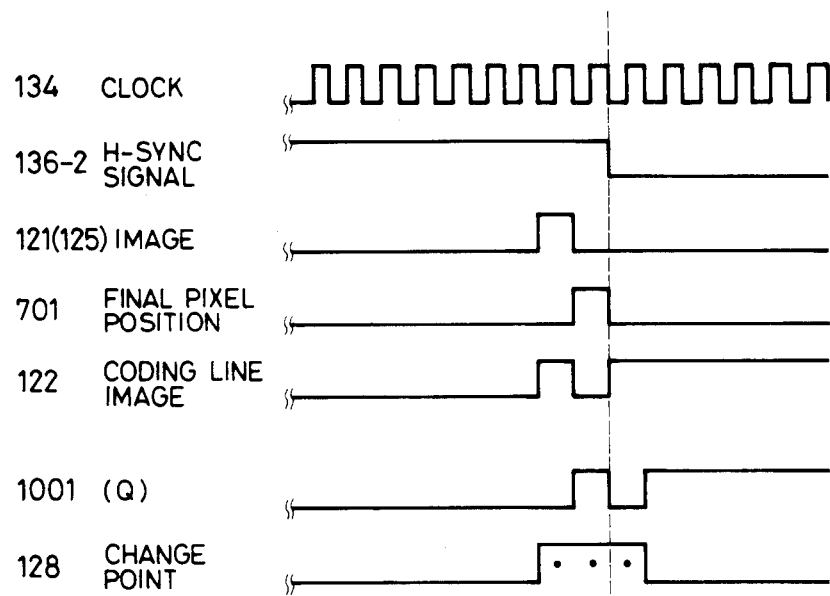
FIG. 8 is a timing chart for explaining the operation of the hypothetical change point generator in FIG. 7.

The hypothetical change point generator A 101 has the same arrangement as the hypothetical change point generator B 105 and can be constituted by a hypothetical change point generator shown in FIG. 7. This hypothetical change point generator comprises a flip-flop 702 AND gates 703, an OR gate 704, and inverters 705. The operation of the circuit in FIG. 7 is shown in the timing chart of FIG. 8. The same reference numerals as in FIGS. 1 and 3 denote the same parts in FIGS. 7 and 8, except that a signal 701 in FIGS. 7 and 8 is obtained by decoding the count of the memory address counter 111 (FIG. 1) and represents a one-line last pixel position (timing). The flip-flop 702 is set in synchronism with the clock 134 at the generation timing of the signal 701 so as to obtain the same color as that of the last pixel of the coding line. After the flip-flop 702 is set, i.e., after the horizontal sync signal 136-2 is disabled, a $\overline{Q}$ output from the flip-flop 702 serves as the signal 122. Before the flip-flop 702 is set, the image signal 121 serves as the signal 122 during generation of the horizontal sync signal 136-2.

Figure 9:
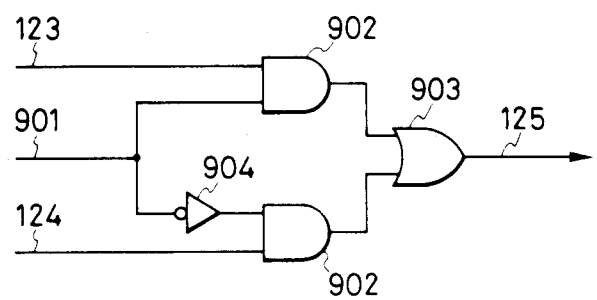
FIG. 9 is a circuit diagram of a selector in FIG. 1.

The selector 104 in FIG. 1 can be constituted by a circuit shown in FIG. 9. The selector 104 comprises AND gates 902, and OR gate 903, and an inverter 904. The outputs 123 and 124 in FIG. 9 are the same as the outputs 123 and 124 from the line buffer memories A and B in FIG. 1. A signal 901 in FIG. 9 is a select signal whose level is inverted for every line of the image. The signal 901 is derived from the horizontal sync signal 136-2 in FIG. 1. The select signal 901 switches outputs for the signal 125.

Figure 10:
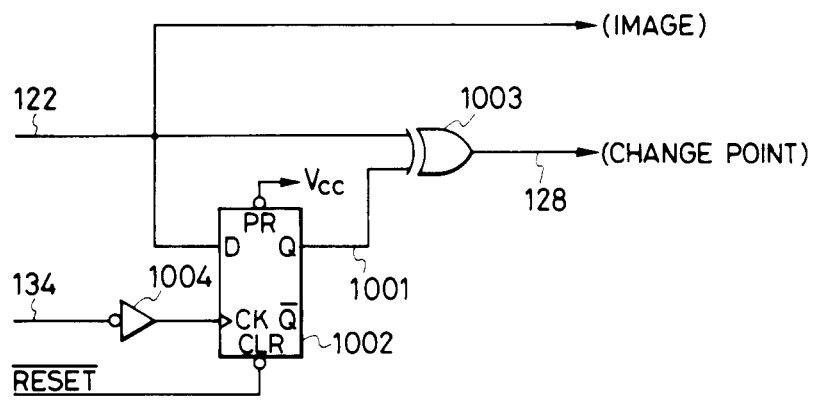
FIG. 10 is a circuit diagram of a change point detection circuit in FIG. 1.

The change point detection circuit A 106 has the same arrangement as that of the change point detection circuit B 107 in FIG. 1. These circuits are represented by the change point detection circuit B 107 in FIG. 10. The detection circuit B 107 comprises a flip-flop 1002, an exclusive OR gate 1003, and an inverter 1004.

As shown in the timing chart of FIG. 8, the signal 122 input to the flip-flop 1002 synchronized with the clock 134 and the Q output therefrom are logically EX-ORed (EXclusive-ORed) to detect that the colors of the adjacent pixels are different, thereby generating the change point signal 128.

The functional blocks of the circuit block in FIG. 2 will be described in detail.

Figure 11:
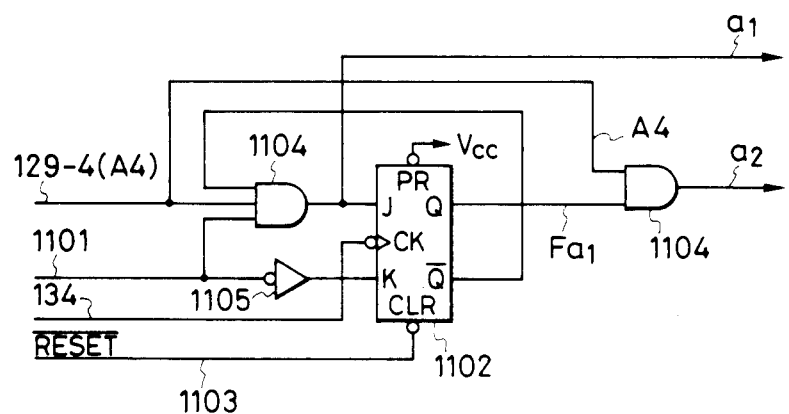
FIGS. 11 and 12 are circuit diagrams showing part of a symbol detection circuit in FIG. 2.

A circuit in FIG. 11 generates the signal Fa1 representing that the pixel a1 or pixels a1 and a2 on the coding line have already been detected. The Fa1 signal generator is arranged in the symbol detection circuit 201 and comprises a flip-flop 1102, AND gates 1104, and an inverter 1105.

The same reference numerals as in FIG. 1 denote the same part in FIG. 11. A signal 1101 in FIG. 11 is a control signal for restoring the initial state (i.e., Q output=logic "0") of the flip-flop 1102 or inhibiting that the Q output is set to be logic "1". The control signal 1101 is normally set at logic "1". A RESET signal 1103 is operated in the same manner as the control signal 1101. If the change point A4 (i.e., the signal 129-4) appears first, then A4="1". In this case, since the e,ovs/Q/ output of the flip-flop 1102="1" and the control signal 1101="1" are given, the AND gate 1104 outputs the symbol a1="1", thus detecting the symbol a1. The a1 detection signal sets the flip-flop 1102 to obtain the Q output="1". The fact that the symbol a1 has already been detected is stored (i.e., Q output=- Fa1="1"). In this state, if A4="1", then a2="1". The symbol a2 is thus detected.

Figure 12:
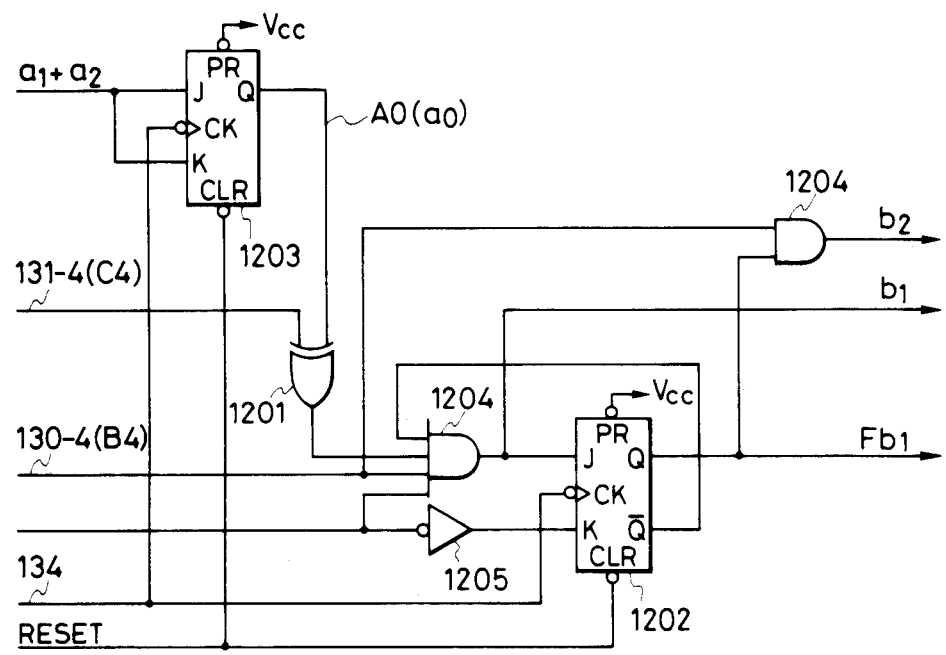

A circuit for detecting the symbol b1 or the like is shown in FIG. 12. This symbol detection circuit comprises an exclusive OR gate 1201, flip-flops 1202 and 1203, AND gates 1204, and an inverter 1205. The same reference numerals as in FIG. 11 denote the same parts in FIG. 12. In the symbol detection circuit in FIG. 12, an exclusive OR signal of the change in reference line and the a0 signal is calculated by the exclusive OR gate 1201 since the symbol b1 must have a color opposite to that of the symbol a0. The circuit in FIG. 12 is included in the symbol detection circuit 201 in FIG. 2.

Figure 13:
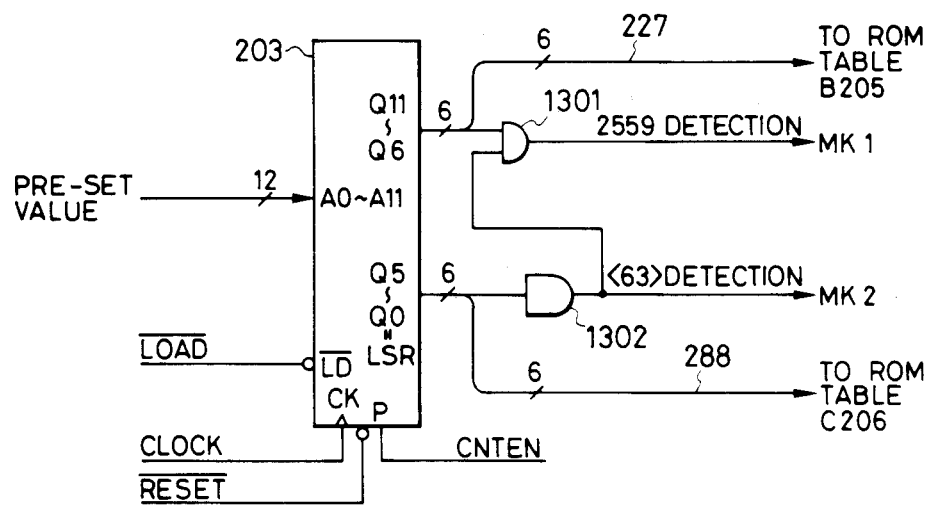
FIG. 13 is a circuit diagram of a run length counter in FIG. 2.

The detailed arrangement of the run length counter 203 in FIG. 2 is shown in FIG. 13. The run length counter 203 comprises a 12-bit binary counter, as previously mentioned. The countable range of the binary counter is 0 (decimal) to 2560-1 (i.e., decimal 2559). The counter 203 has a pre-set function and a clear function. An IC 74F163 available from Fairchild Camera and Instrument Corp., U.S.A. can be used as the counter 203.

The run length counter 203 further includes a circuit 1301 for detecting that a count value output of the counter 203 is decimal 2559 and for generating a signal MK1, and a circuit 1302 for detecting that a value obtained by decoding the lower six bits of the count value output is decimal 63 and for generating a signal MK2.

The pre-set function allows pre-setting of decimal "0" or decimal "1".

The behavior of the run length counter 203 will be described below. The counter 203 is pre-set or cleared to the initial value "0" for every left end of the coding line. The counter 203 counts the clocks in units of pixels within the image area. However, the count of the counter 203 is reset to "1" if the following values ar states are obtained:

(1) if the change point a1 or a2 is detected
(2) if the count reaches 2559
(3) if the P- or V-mode code is generated However, if the change point a1 is defined as a2 on the pixel excluding the right most end of the coding line according to the coding rules, the count of the counter 203 is cleared to "0" upon detection of the pixel a1.

The arrangement of the ROM table A 204 in FIG. 2 will be described in detail below. The ROM table A 204 is arranged to generate eight P- and V-mode codes and their code length data. As is apparent from the principle of constitution of this embodiment and the previous description, when the relative relationship between the change point positions on the coding and reference lines appears (especially, the change point b2 on the reference line appears in the B4 output of the register B 109 or the change point a1 on the coding line appears in the A4 output of the register A 108), the state of the sign detection circuit 201 and the output states of the registers A 108, B 109, and C 110 can be simultaneously determined at the corresponding time. The combinations of these outputs are finite and can be regarded as static outputs at the determination time. Therefore, the P- or V-mode code and its code length data to be output for each combination can be determined, thereby constituting the ROM table. The detailed contents of the ROM table are redundant and are exemplified by an equivalent logic circuit of the ROM shown in FIG. 14. The equivalent circuit generates a P-mode code and its code length data. The circuit comprises inverters 1409, timing circuits 1410, a NAND gate 1411, and a NOR gate 1412. A signal 1401 in FIG. 14 represents that the change point b2 on the reference line is detected by the symbol detection circuit 201 in FIG. 2.

That is, the change point as the pixel b2 is present in the B4 output of the register B 109 in FIG. 1. An a1 signal 1402 in FIG. 14 represents the change point a1 in the A4 output of the register A 108 in FIG. 1. An Fa1 signal 1403 in FIG. 14 represents that the symbol detection circuit 201 (FIG. 2) has already detected the change point a1.

Figure 14:
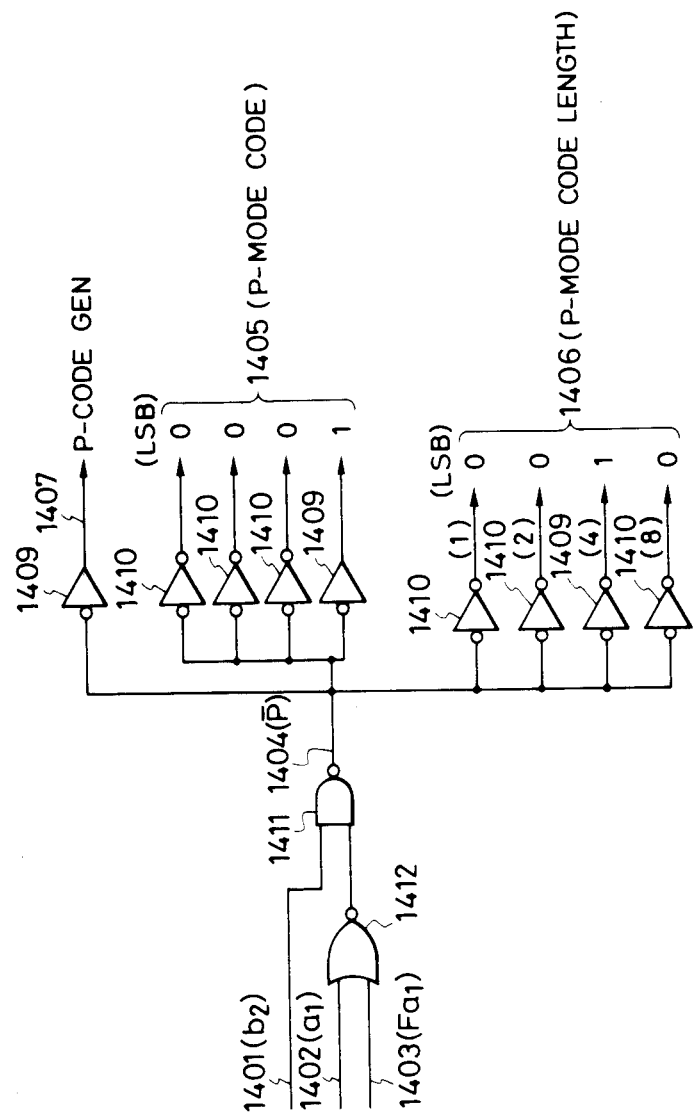
FIG. 14 is a circuit diagram of an equivalent circuit of a ROM table A in FIG. 2.

The logic circuit in FIG. 14 determines the P-mode by a "false" a1 or Fa1 signal upon detection of the pixel b2. In other words, after the start point pixel a0, the change point a1 is not present until the time when the pixel b2 is detected. That is, on the image, the change point a1 is not present from the start point pixel a0 to the position immediately below the change point pixel b2. Therefore, the mode is determined as the P-mode according to the definition. The P mode is detected by a P-mode detection signal 1404. The resultant P-mode code is represented by a code 1405. Code length data 1406 represents the P-mode code length data. Generation of the P-mode code is detected by a signal 1407. The above description has been made for determining the P-mode. The same procedures and arrangements as for the P-mode can be applied for the V-mode, thus constituting the ROM table A 204.

At the time when the b2 or a1 signal is detected, the status signals of the registers are supplied as input data to the ROM table A 204 (FIG. 2) to generate the P- or V-mode code and its code length data for a one-clock period.

Figure 15:
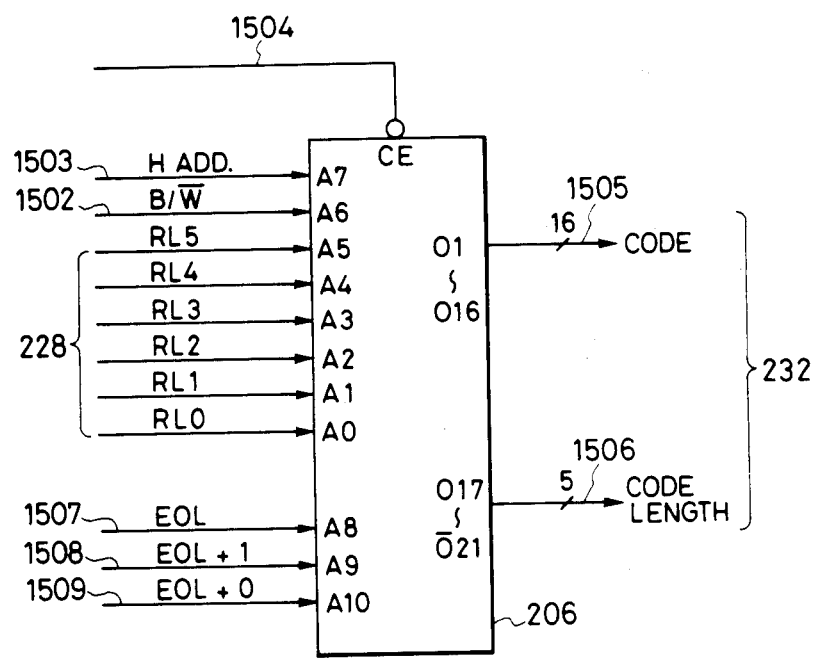
FIG. 15 is a block diagram of a ROM table C in FIG. 2.

Since the ROM table B 205 and the ROM table C 206 have identical arrangements, they are represented by the ROM table C 206 in FIGS. 15 and 16.

A ROM 206 has at least an 11-bit address input, and a 21-bit parallel output. An input 228 corresponds to the signal 228 in FIG. 2, and is the lower six bits of the run length counter 203 in FIG. 2. An input 1502 in FIG. 15 is a signal for designating the color of the run length; "0" for white and "1" for black in this embodiment. An input 1503 is a signal for designating whether the code (=001) representing the H-mode is added. If added, the signal level is "1"; otherwise, it is "0". If the input 1503 is set at logic "1". The code "001" is added to the first run length code in the H mode, and the resultant code is output for a one-clock period. A chip enable signal 1504 controls whether the output from the ROM 206 is enabled. Address inputs are an EOL 1507, and EOL+1 1508, and an EOL+0 1509. In response to each address input together with the clock pulse, the terminating code of the corresponding line can be read out. An address code output 1505 is accessed by the address input. Another output is code length data 1506.

FIG. 16 is a table showing the relationship between addresses A0 and A10 and the storage contents (data) in FIG. 15.

Figure 17:
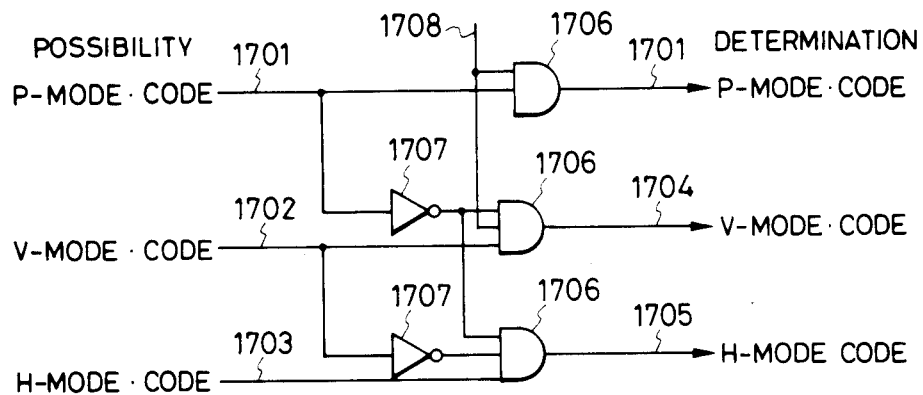
FIG. 17 is a circuit diagram of a code determination circuit in FIG. 2.

The detailed arrangement and operation of the code determination circuit 212 in FIG. 2 will be described in detail with reference to FIG. 17. The code determination circuit 212 comprises AND gates 1706 and inverters 1707.

As is apparent from the principle of code generation in this embodiment, in the prestage where the P-, V-, and H-mode codes are not yet determined as the final code by the ROM table 204, 205, or 206 in FIG. 2, two of the P-, V-, and H-mode codes may often be output from the corresponding ROM tables. However, one of these codes is selected according to the predetermined priority order, as previously mentioned. The circuit in FIG. 17 solely determines the code to be generated.

If P-, V-, and H-mode codes are simultaneously generated, the code having the higher priority is selected according to the following priority order:

P-mode > V-mode > H-mode

The nonselected codes are then disabled and are not generated.

A mode signal 1708 determines whether the coding circuit is used for MH coding, i.e., one-dimensional coding, or the MMR or MR coding, i.e., two-dimensional coding. If one-dimensional coding is performed, the mode signal 1708 is set at low level. Otherwise, it is set at high level.

When one-dimensional coding is performed, generation of the P- and V-mode codes is inhibited. Only the H-mode code, i.e., the code representing the run length is enabled.

The roles of the latch A 207 and the latch B 208 in FIG. 2 will be described below. The latches A 207 and B 208 are circuits for temporarily storing the H-mode make-up code and its code length data, both of which are generated during coding, until the validity of the H mode is determined. If the H mode is valid, the contents of the latches are transferred to the next-stage circuit.

The behavior of the latches A 207 and B 208 will be described when the run length of the make-up code is generated, e.g., when a run length=2972. In this case, the code is divided into three run length codes (i.e., two make-up codes and one terminating code) and the codes are output.

(1) Make-up code 1=run length 2560 code (common for white and black)
(2) Make-up code 2=run length 384 code (white or black)
(3) Terminating code=run length 28 code (white or black)

If one run length is represented by a plurality of codes, i.e., 2560+384+28 (=2974), the A4 output of the register A 108 is determined whenever the count of the run length counter 203 is $63 \times 64 \times N$ (N=a positive integer, i.e., 0, 1, 2, ...). If the change point a1 is not present in the A4 output, generation of the make-up code is predicted. A make-up code one higher than the value (corresponding to N) of the upper six bits of the counter 203 and the corresponding code length data are read out from the ROM table B 205. The readout data is temporarily stored (latched) in the latch B 208. Subsequently, whenever the count is incremented by 64 (i.e., N in $63+64 \times N$ is incremented by one), the contents of the latch B 208 are updated.

When the count of the run length counter 203 reaches 2559 (i.e., N in $63+64 \times N$ is 39), the A4 output of the register a 108 is checked. If the change point pixel a1 is not detected at this time, a run length of 2560 or more in the current count can be expected. In the same manner as described above, the code and the code length data, both of which correspond to the run length of 2560, are read out from the ROM table B 205. The readout data is temporarily stored in the latch A 207. At the same time, the storage contents of the latch B 208 are disabled. The count value of the run length counter 203 returns to the initial value "1". When the count is subsequently updated, storage of the make-up codes to the latch B 208 is started for every value of $63+64 \times N$.

When the change point a1 is detected, the contention with other modes, i.e., P- and V-modes is determined. If the H-mode is determined, the terminating code and its code length data, both of which are of the run length represented by the value of the lower six bits of the run length counter 203 at the time corresponding to the change point pixel a1, are temporarily stored in the latch C 209. The contents of the latches A 207 and B 208 are also valid or enabled, as described above.

If the V-mode code is generated at the time corresponding to the change point pixel a1, the H-mode code is not generated. In this case, the contents of the latches A 207 and b 208 are disabled. The V-mode code as a valid code instead of the terminating code is latched by the latch C 209.

Figure 18:
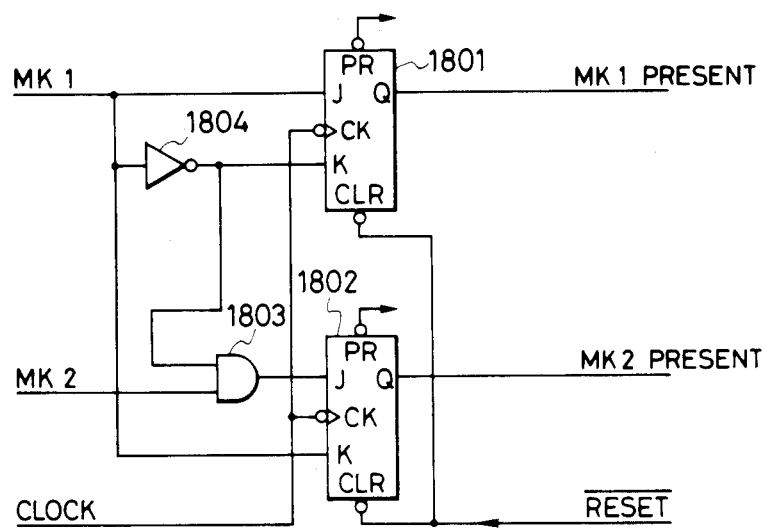
FIG. 18 is a circuit diagram of a make-up code generator memory in FIG. 2.
Figure 19:
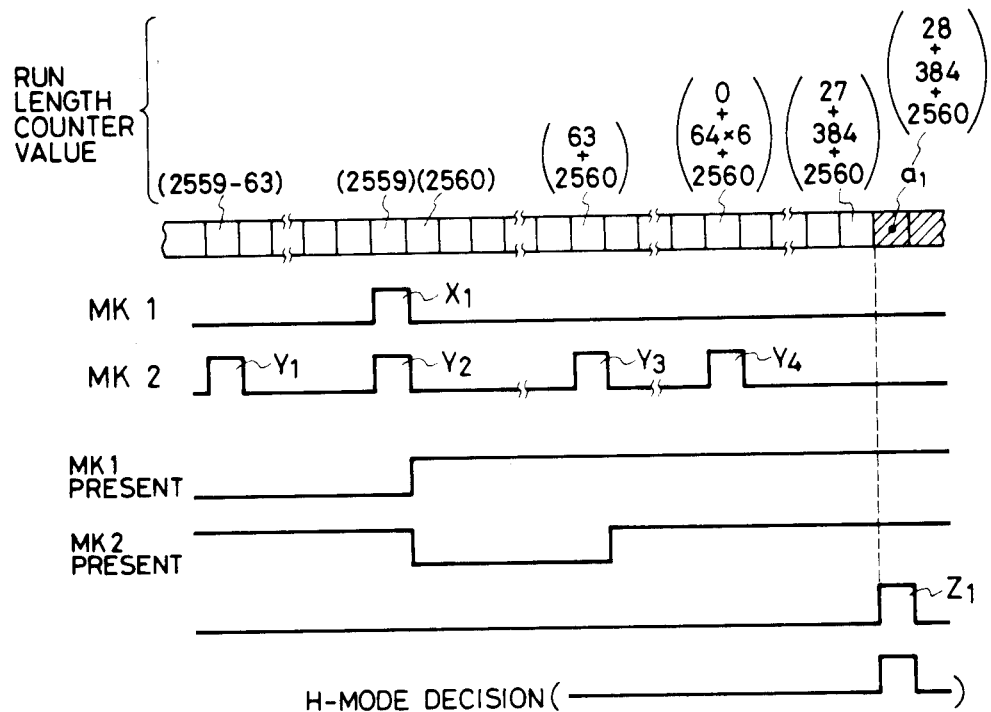
FIG. 19 is a timing chart for explaining the operation of the make-up code generator memory in FIG. 18.

A circuit for generating and storing the make-up code 1 and the made-up code 2 is shown in FIG. 18. This circuit is included in the timing circuit 112. The timing chart for explaining the operation of the circuit in FIG. 18 when the run length is 2972 is shown in FIG. 19. The circuit in FIG. 18 comprises flip-flops 1801 and 1802, an AND gate 1803, and an inverter 1804.

The signals MK1 and MK2 are signals output from a 2559 detection circuit 1301 and a 63 detection circuit 1302 in the run length counter 203. The flip-flop 1802 is set in response to the signal MK2 and generates the MK2 detection signal. The flip-flop 1801 is set in response to the signal MK1 and generates the MK1 detection signal. The flip-flop 1802 is reset in response to signal MK1.

If the count of the run length counter 203 is 64 or more, the MK2 detection signal is set at high level. If the count of the run length counter 203 exceeds 2560, only the MK1 detection signal or both the MK1 and MK2 detection signals are set at high level. Whether the code representing the run length is only a terminating code or a combination of the terminating and make-up codes, and whether the number of make-up codes is 1 or 2 are determined according to the levels of the MK1 and MK2 detection signals. If a code is generated in the H mode, the levels of the MK1 and MK2 detection signals are detected by a packing circuit 211. The packing circuit selects effective ones of the three latches A, B, and C and fetches the latched data.

Generation of the make-up code is expected and a time at least a one-clock period before the generation of the make-up code. The code is stored in the temporary storage circuits (latches A and B). Upon detection of the change point a1, the number of output codes simultaneously processed and the number of bits can be reduced, thus providing advantages in practical circuit design The required numbers of make-up codes and their code length data among the ones counted before the run length counter 203 determines the H mode are temporarily stored in the latches A 207 and B 208. Upon determination of the H mode, only the terminating code and its code length data are processed. Therefore, upon detection of the pixel a1, all H-mode codes are prepared, thereby performing subsequent coding without delay.

The contents of the latches A 207, B 208, and C 209 are sequentially sent out to the next-stage circuit in the order of A 207, B 208, and C 209 (therefore buffer memory 210). In this case, if the latched contents are invalid, they are omitted and neglected.

The contents of the latch C 209 are temporarily sotred in the buffer memory 210 for the following reason. The next coding is started from the time next to determination of the coding mode, and the next coding data is often input from the ROM table to the latch C 209 within a time period of several clocks (a minimum of one clock). In this case, the previously latched data is damaged. After the mode is determined, the contents of the latch C 209 are sent to the buffer memory 210 so as to latch the next coding data. The buffer memory 210 is timed to output this coding data to the subsequent stage.

A special case will be described wherein the change points a1 and a2 are set on an identical pixel according to the coding rules.

Figure 20:
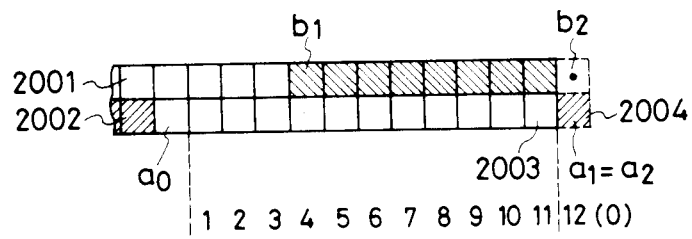
FIG. 20 is a schematic view for explaining a relationship between a reference line and a coding line.

FIG. 20 illustrates this case. Referring to FIG. 20, the image signal consists of a reference line 2001 and a coding line 2002. The coding line 2002 has a last pixel 2003 and a hypothetical change point (pixel) 2004.

Figure 21:
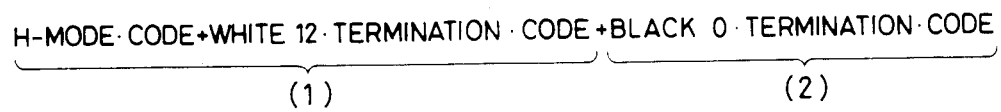
FIG. 21 is a representation showing an H-mode code.

Referring to FIG. 20, assume that the start point pixel a0 is located in the illustrated position as a result of coding from the left direction. In this case, the code to be generated next is the "H-mode code +white 12 termination code +black 0 termination code". The code (1) in FIG. 21 can be processed as a single code by the above-mentioned means at the time corresponding to the change point a1. However, the code (2) in FIG. 21 is a code to be generated at the time corresponding to the change point a2 when the change point a2 is to be detected at a time different from that of the change point a1. In this case, the code (2) cannot be clearly detected as the change point a2 by the symbol detection circuit 201.

Figure 22:
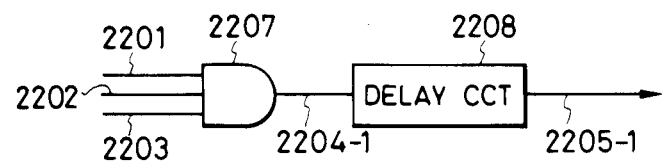
FIG. 22 is a schematic diagram of a hypothetical change point delay circuit.
Figure 23:
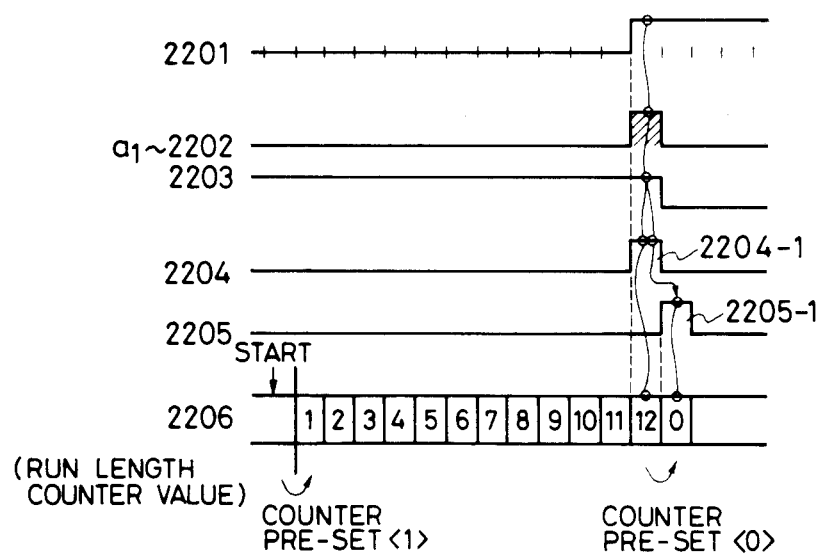
FIG. 23 is a timing chart for explaining the operation of the delay circuit in FIG. 22.

In this case, a circuit (FIG. 22) arranged in the symbol detection circuit 201 performs the following processing. The operation of the circuit in FIG. 22 is shown in the timing chart of FIG. 23. Referring to FIG. 22, a signal 2201 represents a hypothetical area in the image. The signal 2201 is generated by inverting the horizontal signal. A signal 2202 serves as an a1 change point detection signal. A signal 2203 represents a period until the first terminating code is generated. These signals are monitored and a logical AND signal of the signals 2201 and 2203 is produced by an AND gate 2207 to detect the state in FIG. 20 and to produce a signal 2204-1 (the time is the same as that for the pixel a1). The code (1) in FIG. 20 is output in the same manner as described above. Predetermined operations including an operation for clearing the run length counter to zero are performed. The signal 2204-1 in FIG. 22 is delayed by a delay circuit 2208 of a D flip-flop by a one-clock period. The resultant signal 2205-1 is used to generate the termination code (2) (FIG. 21) of black (="0").

The packing circuit 211 in FIG. 2 receives the code and its code length data obtained by the method described above (the lengths, i.e., the numbers of bits) of codes sequentially generated are not predetermined, provided that a maximum code length is 16 bits including the H-mode code (=001), and produces 16-bit signals. In this embodiment, 16-bit parallel signals are sent to an external circuit.

A signal 238 in FIG. 2 is a 16-bit code generated by the packing circuit 211. A signal 239 is an acknowledge signal for acknowledging to the next-stage external circuit that the data is output as a packed 16-bit signal. The packing circuit 211 can be easily realized by combining conventional circuits such as a code length adder, a bit shifter, a multiplexer, and a latch.

A signal RTC (Return To Control) representing the end of one page will be described. In the case of MMR coding, the RTC code=EOL code x 2. More specifically, the RTC signal (000000000001) x 2=000000000001, 000000000001. In the above embodiment, the 16-bit code can be output for a one-clock period. In order to output the signal RTC, the end of one page is detected by monitoring the vertical sync signal 136-1 or the like in FIG. 3. A two-clock period pulse is then supplied as an address signal 1570 to the ROM table C 206 (FIG. 15). The code EOL and its code length data are written at the designated address of the ROM table C 206. Upon readout of these signals from the ROM table C 206, the code RTC can immediately follow the image code.

The differences between the three coding schemes are summarized in Table 1.

TABLE 1

| | Coding Scheme | | |
|---|---|---|---|
| Item | MMR High-efficiency two-dimensional coding | MR Two-dimensional coding | MH One-dimensional coding |
| Two-Dimensional Line | All lines | (K-1) lines | None |
| One-Dimensional Line | None | Every K lines | All lines |

TABLE 1-continued

| Item | Coding Scheme | | |
|---|---|---|---|
| | MMR High-efficiency two-dimensional coding | MR Two-dimensional coding | MH One-dimensional coding |
| K Parameter | K = ∞ or equivalent | K = 2 K = 4 (optional) etc. | None |
| Line Termination Code | None | One-dimensional line = EOL + 1 Two-dimensional line = EOL + 0 | All lines = EOL |
| Hypothetical Line | All white lines | None | None |
| Hypothetical Pixel (Left) | White pixel | White pixel | White pixel |
| Hypothetical Pixel (Right) | Inversion of last pixel | Inversion of last pixel for two-dimensional processing; None for one-dimensional processing | None |
| RTC Code (EOFB) | EOL × 2 | (EOL + 1) × 6 | EOL × 6 |
| Fill | None | Present | Present |
| P Mode V Mode H Mode | Yes (mixed) | Yes for two-dimensional line (Mixed) No for one-dimensional line | No (the mode is similar to H mode) |

MH coding is substantially the same as the case wherein the H-mode in MMR coding is repeated, except for the following points:

(1) The H-mode code (=001) is not required in MH coding
(2) A pair of white and black run lengths is not required in MH coding
(3) The code EOL must be inserted for each line in MH coding
(4) The codes RTC in MMR coding and MH coding are different The similarities to or differences between the MR coding scheme and the MH or MMR coding scheme are given as follows:

(1) The one-dimensional line in MR coding is the same as that in MH coding
(2) The two-dimensional line in MR coding is the same as that in MMR coding
(3) The line termination in M coding is EOL +1 =0000000000011 or EOL +0=0000000000010
(4) The codes RTC in MR coding and MH or MMR coding are different
(5) One- and two-dimensional lines are mixed in MR coding due to the K parameter.

Switching between the three coding schemes can be easily achieved such that the behavior of the circuit in MMR coding is controlled in response to a selection signal for selecting the MR or MH coding scheme.

Figure 24:
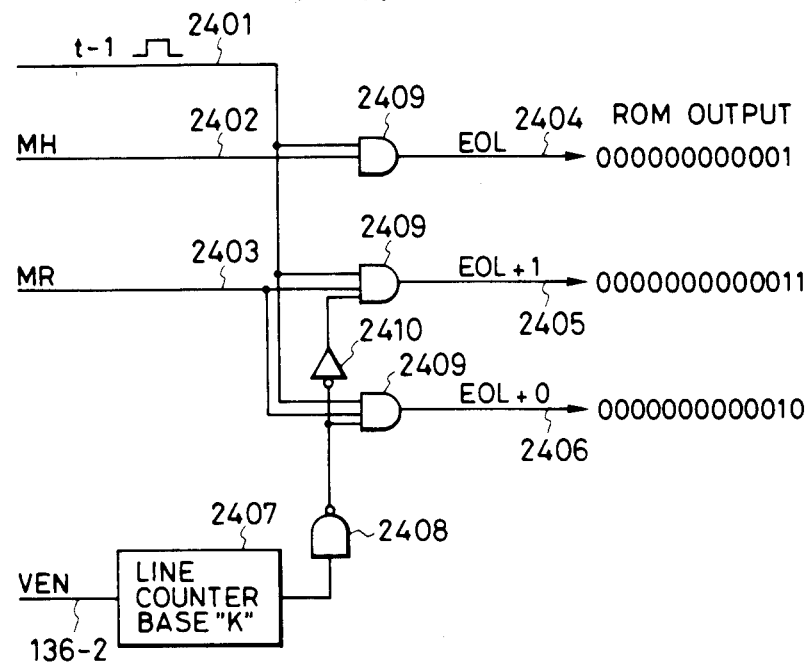
FIG. 24 is a schematic diagram of a line termination code generator control circuit.

A circuit for identifying the line, the termination, and the code is shown in FIG. 24. The circuit comprises a NAND gate 2408, AND gates 2409, and an inverter 2410. A pulse signal 2401 appears at time t-1 along the time base 320 in FIG. 3. The pulse signal 2401 is generated for each coding line. Any code associated with image coding is not generated at time t-1. The pulse signal at time t-1 is obtained by decoding a value of the address counter 111. Coding scheme selection signals 2402 and 2303 are supplied from an external circuit such as a CPU for designating a coding scheme. A signal 136-2 in FIG. 24 corresponds to that in FIG. 3. A base "K" line counter 2407 counts pulses of the signal 136-2 to monitor the value of the K parameter in MR coding.

Signals 2404 to 2406 obtained by the logic circuit in FIG. 24 are used as address inputs (corresponding to the inputs 1507 and 1508 in FIG. 15) to the ROM table C 206 in FIG. 2 to access the specific addresses thereof. The necessary codes and their code length data are stored at the specific addresses of the ROM table C 206 and are then read out therefrom to obtain a desired line termination code.

The one-dimensional line in MH coding can be controlled by a selection signal 1708 so as to cause the MMR mode determination circuit (FIG. 17) to give the highest priority to the H-mode.

MH coding does not require the H-mode code (=001). This can be achieved by setting an address bit A7 of the ROM table C 206 to be 0.

The different numbers of codes EOL in the codes RTC for different coding schemes can be obtained by changing the number of pulses applied to the ROM table C 206.

Figure 25:
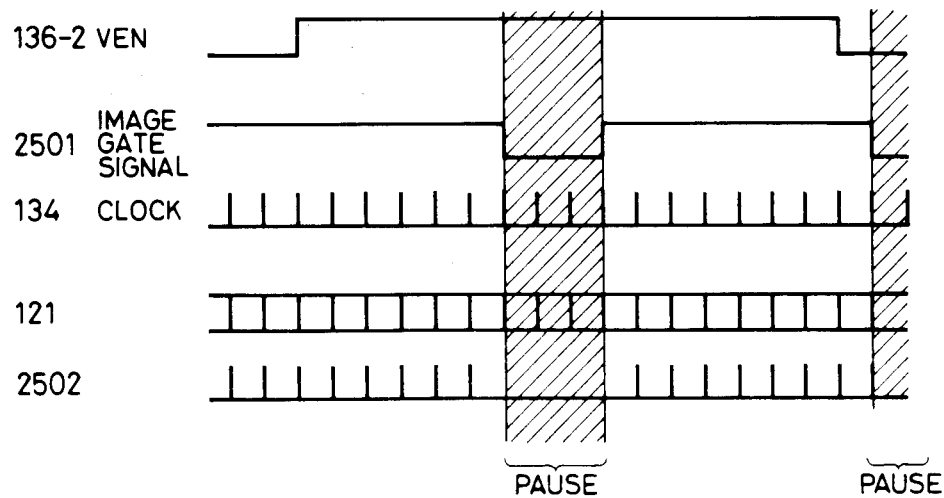
FIG. 25 is a timing chart for explaining an interrupt control operation of coding.

In this embodiment, the coding circuit is operated in synchronism with the image clocks 134. Even if the clock interval (period) is changed, coding can be properly performed. As shown in FIG. 25, a pause can be provided in the image or between lines according to a technique for causing an image gate signal to mask the clocks 134.

Referring to FIG. 25, when an image gate signal 2501 is set at logic "0", the image clocks 134 are disabled. An AND signal of the image gate signal 2501 and the clocks 134 is given as clocks 2502 whose masked pulses are omitted. IF the clocks 2502 are supplied to the internal circuit of the coding apparatus of this embodiment in place of the clocks 134, the logical status is changed in response to only this clock signal. Therefore, coding is paused for a period corresponding to the hatched portion in FIG. 25.

The output rate of the image signal from a source of the image signal to be coded is not limited by the speed of the coding circuit. In the image signal source as an image file with a disk, even if a one-page image signal output is intermittently generated, the coding circuit is operated in response to the intermittent operation. Therefore, a buffer memory or the like of a large capacity need not be used to match the output rate of the image signal output source and coding rate of the coding circuit. Image signals from the output source can be sequentially coded.

Figure 26:
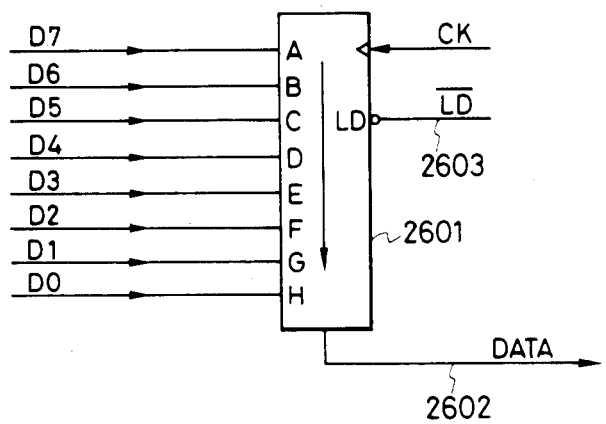
FIG. 26 is a block diagram of an image signal parallel-to-serial converter.

A method of supplying a parallel signal of an image to be coded to the coding circuit of this embodiment will be described with reference to FIGS. 26 and 27. A parallel/serial shift register 2601 receives 8-bit parallel data and outputs 1-bit serial data 2602.

Figure 27:
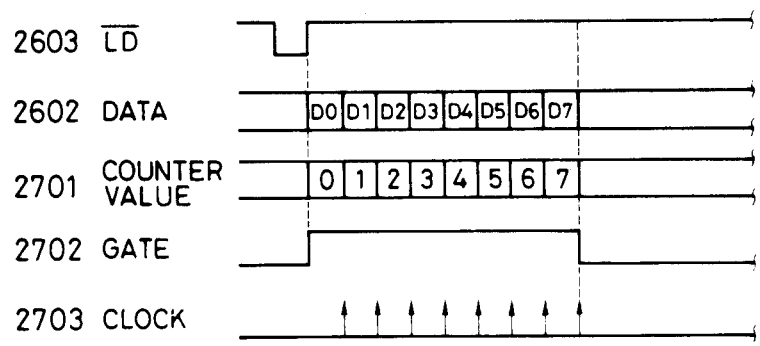
FIG. 27 is a timing chart showing the output status of the parallel-to-serial converter in FIG. 26.

As shown in FIG. 27, an image signal to be coded is loaded as 8-bit parallel data in the register 2602 and the parallel data is converted to serial data in response to clocks, thereby obtaining the serial image signal 2602 shown in FIG. 27. The clocks during parallel/serial conversion are counted to produce a gate signal 2702 representing a real data period. Clocks 2703 corresponding to the read data can also be produced in the same manner as described above.

The signals shown in FIGS. 27 have codable formats according to the pause method described in FIG. 25. Parallel/serial conversion of the image can be effectively used when an image is supplied from the CPU or the like.

In the above embodiment, MH, MR, and MMR coding schemes are exemplified. However, the present invention can also be applied to other coding schemes. In addition, the image signal to be coded may be supplied from a computer or an apparatus for photoelectrically reading an original image. The coded code may be transmitted to a remote area through a transmission line or the like, and may be stored in an image file. The present invention has been described with reference to a preferred embodiment but is not limited thereto. Various changes and modifications may be made within the spirit and scope of the invention.

As described above, a serial image signal is converted to parallel data, and the parallel data can be coded on a real-time basis without requiring a memory of a large capacity.

In coding, coding codes of the respective modes can be simultaneously generated and selected according to the priority order. An optimal coding code can be immediately output at the mode determination time. Therefore, coding can be performed without being delayed with respect to the image signal input.

In coding for a plurality of modes, the coding code can be immediately generated at the mode determination time. Therefore, high-speed, real-time coding can be achieved.

Since coding is performed after an image signal consisting of pixels required for coding is input, coding can be properly performed and is not delayed with respect to the input image signal.

In coding of an image signal having a long run length requiring a plurality of codes, coding codes are prestored by predicting the coding codes to be generated and are then read out. Therefore, the coding load can be reduced at the time of output of the code. At the same time, coding can be performed without being delayed with respect to the image signal input.

An identification code representing a coding mode and a start coding code are output as an integral code, so that an output time can be shortened compared with that required for outputting a plurality of codes. Therefore, coding can be achieved without being delayed with respect to the input image signal.

A code for an identical pixel is divided into a plurality of codes to reduce the load of the coding circuit, thereby effectively performing coding.

The single coding apparatus can be applied to a plurality of coding schemes. Coding can thus be suitable for the subsequent processor without greatly modifying the circuit arrangement.

What is claimed is:

1. An image signal coding apparatus comprising:
   receiving means for receiving a serial reference line image signal in synchronism with a serial coding line image signal;
   first converting means for inputting serial change point data representing a change point in the reference line image signal received by said receiving means and outputting parallel reference line change point data;
   second converting means for receiving serial change point data representing a change point in the coding line image signal and outputting parallel coding line change point data;
   means for monitoring output states of said first and second converting means;
   means for counting the number of pixels between the change points in the coding line image signal; and
   coding means for coding the coding line image signal in response to outputs from said monitoring means and said counting means.

2. An apparatus according to claim 1, wherein said monitoring means monitors a positional relationship between the change point in the coding line image signal and the change point in the reference line image signal.

3. An apparatus according to claim 1, wherein said first and second converting means output parallel image signals having the numbers of pixels required for coding.

4. An apparatus according to claim 1, further comprising storage means for storing a previously input coding line image signal and then outputting it as the reference line image signal.

5. An apparatus according to claim 1, wherein said coding means includes a memory table for receiving the outputs from said monitoring means and said counting means as address signals and for outputting coded data.

6. An apparatus according to claim 1, wherein the coding line image signal comprises binary data representing a density of each pixel.

7. An image signal coding apparatus comprising:
   receiving means for receiving a reference line image signal in synchronism with a coding line image signal;
   first generating means for generating a fist coding code on the basis of the number of pixels between change points in the coding line image signal;
   second generating means operable in parallel with said first generating means on a time basis for monitoring a correlation between the coding line image signal and the reference line image signal and generating a second coding code on the basis of the correlation; and selecting means for selecting one of the first and second coding codes in accordance with a predetermined priority order if the first and second coding codes are simultaneously generated from said first and second generating means.

8. An apparatus according to claim 7, wherein said second generating means monitors a positional relationship between the change point of the coding line image signal and a change point of the reference line image signal.

9. An apparatus according to claim 7, wherein said first generating means includes a memory table for receiving data representing the number of pixels as an address signal and for outputting a coding code.

10. An apparatus according to claim 7, wherein said second generating means includes a memory table for receiving data representing the correlation as an address signal and for outputting a coding code.

11. An apparatus according to claim 7, further comprising storage means for storing a previously input coding line image signal and then outputting it as the reference line image signal.

12. An apparatus according to claim 7, wherein the coding line image signal comprises binary data representing a density of each pixel.

13. An image signal coding apparatus comprising:
receiving means for receiving a reference line image signal in synchronism with a coding line image signal;
means for counting the number of pixels between change points in the coding line image signal;
means for monitoring a correlation between the coding line image signal and the reference line image signal;
coding means for coding the coding line image signal in response to outputs from said monitoring means and said counting means; and
means for storing, when a count of said counting means reaches a predetermined value, a coding code representing the predetermined value, wherein
when said monitoring means monitors the correlation, as to which said coding means should perform a coding operation using a coding code representing the number of pixels between change points, said coding means performs the coding operation using the coding code stored in said storing means.

14. An apparatus according to claim 13, wherein said monitoring means monitors a positional relationship between the change point in the coding line image signal and a change point in the reference line image signal.

15. An apparatus according to claim 13, wherein said coding means comprises first coding means for generating the coding code on the basis of the count of said counting means.

16. An apparatus according to claim 13, wherein said coding means comprises second coding means for generating the coding code on the basis of an output from said monitoring means.

17. An apparatus according to claim 13, further comprising storage means for storing a previously input coding line image signal and then outputting it as the reference line image signal.

18. An apparatus according to claim 13, wherein the coding line image signal comprises binary data representing a density of each pixel.

19. An image signal coding apparatus comprising:
receiving means for receiving a reference line image signal in synchronism with a coding line image signal;
means for monitoring a correlation between the coding line image signal and the reference line image signal; and
means for coding the coding line image signal on the basis of the correlation monitored by said monitoring means,
wherein the coding operation performed by said coding means is initiated after receiving the coding line image signal of the number of pixels required for the monitoring operation of said monitoring means by said receiving means.

20. An apparatus according to claim 19, wherein said monitoring means monitors a positional relationship between a change point in the coding line image signal and a change point in the reference line image signal.

21. An apparatus according to claim 19, further comprising means for counting the number of pixels between the change points in the coding line image signal, and wherein said coding means performs coding on the basis of outputs from said counting means and said monitoring means.

22. An apparatus according to claim 19, wherein said coding means includes means for storing a signal associated with the coding line image signal of the number of pixels required for the monitoring operation of said monitoring means.

23. An apparatus according to claim 19, wherein said coding means includes a memory table for receiving an output from said monitoring means as an address signal and for outputting the coding code.

24. An apparatus according to claim 19, further comprising storage means for storing a previously input coding line image signal and then outputting it as the reference line image signal.

25. An apparatus according to claim 19, wherein the coding line image signal comprises binary data representing a density of each pixel.

26. An image signal coding apparatus comprising:
receiving means for receiving a reference line image signal in synchronism with a coding line image signal;
means for monitoring a correlation between the coding line image signal and the reference line image signal;
means for counting the number of pixels between change points of the coding line image signal;
coding means for coding the coding line image signal in response to outputs from said monitoring means and said counting means; and
means for storing a coding code representing a predetermined value generated by said coding means when a count of said counting means reaches a value immediately preceding the predetermined value, wherein
the coding code stored in said storing means is read out when a change point pixel is detected.

27. An apparatus according to claim 26, wherein said coding means comprises:
means for generating a signal representing that the count of said counting means reaches the value immediately preceding the predetermined value.

28. An apparatus according to claim 26, wherein the coding line image signal comprises binary data representing a density of each pixel.

29. An apparatus according to claim 26, wherein the predetermined value is 64n, with n representing an integer of not less than 1.

30. An image signal coding apparatus comprising:
receiving means for receiving a reference line image signal in synchronism with a coding line image signal;
means for counting the number of pixels between change points of the coding line image signal;
determining means for monitoring a correlation between the coding line image signal and the reference line image signal and determining a coding mode; and
means for generating the coding code on the basis of a count of said counting means;
wherein an identification code representing a mode determined by said determining means and a start coding code to be generated by said generating means are output as an integral code.

31. An apparatus according to claim 30, wherein said determining means monitors a positional relationship between the change point in the coding line image signal and a change point in the reference line image signal.

32. An apparatus according to claim 30, wherein said generating means includes a memory table for receiving the count of the counting means as an address signal and for generating the coding code.

33. An apparatus according to claim 30, further comprising storage means for storing a previously input coding line image signal and then outputting it as the reference line image signal.

34. An apparatus according to claim 30, wherein the coding line image signal comprises binary data representing a density of each pixel.

35. An image signal coding apparatus comprising:
receiving means for receiving a reference line image signal in response to a coding line image signal;
means for counting the number of pixels between coding line change points;
means for monitoring a correlation between the coding line image signal and the reference line image signal; and
means for generating a coding code on the basis of an output from said monitoring means;
wherein said generating means outputs a start coding code to be generated in correspondence with a given pixel and subsequent codes are output following the start coding code when a plurality of coding codes including the start and subsequent coding codes are output for the given pixel.

36. An apparatus according to claim 35, wherein said monitoring means monitors a positional relationship between the change point in the coding line image signal and a change point in the reference line image signal.

37. An apparatus according to claim 35, further comprising storage means for storing a previously input coding line image signal and then outputting it as the reference line image signal.

38. An apparatus according to claim 35, wherein the coding line image signal comprises binary data representing a density of each pixel.

39. An apparatus according to claim 35, wherein said generating means includes a memory table for receiving outputs from said monitoring and counting means as address signals and for outputting the coding code.

40. An image signal coding apparatus comprising:
receiving means for receiving a reference line image signal in response to a coding line image signal;
means for counting the number of pixels between change points on the coding line image signal;
means for monitoring a correlation between the coding line image signal and the reference line image signal; and
means for coding the coding line image signal in response to outputs from said counting means and said monitoring means, wherein
said apparatus is arranged such that all of said means are operated in synchronism with common clock signals, so that the progress of the coding operation by said coding is controlled in accordance with the supplying state of the common clock signals.

41. An apparatus according to claim 40, wherein said monitoring means monitors a positional relationship between the change point of the coding line image signal and a change point of the reference line image signal.

42. An apparatus according to claim 40, wherein said coding means includes a memory table for receiving data representing the number of pixels as an address signal and for outputting a coding code.

43. An apparatus according to claim 40, wherein said coding means includes a memory table for receiving data representing the correlation as an address signal and for outputting a coding code.

44. An apparatus according to claim 40, further comprising storage means for storing a previously input coding line image signal and then outputting it as the reference line image signal.

45. An apparatus according to claim 40, wherein the coding line image signal comprises binary data representing a density of each pixel.

* * * * *

UNITED STATES PATENT AND TRADEMARK OFFICE
CERTIFICATE OF CORRECTION

PATENT NO. : 4,799,110
DATED : January 17, 1989
INVENTOR(S) : KATSUTOSHI HISADA ET AL.     Page 1 of 3

It is certified that error appears in the above-identified patent and that said Letters Patent is hereby corrected as shown below:

ON TITLE PAGE:

AT [56] REFERENCES CITED

U.S. Patent Documents, "4,543,612 9/1988 Matsunaga et al." should read --4,543,612 9/1985 Matsunaga et al.--.
U.S. Patent Documents, "Hagamuma et al." should read --Haganuma et al.--.

COLUMN 1

Line 6, "and" should read --an--.

COLUMN 4

Line 20, "read write access." should read --read/write access.--.
Line 45, "a" should read --as--.
Line 60, "amount" should read --among--.

COLUMN 5

Line 48, "all white" should read --all-white--.

COLUMN 8

Line 23, "H+M(a0a1) +M(a0a1)" should read --H+M(a0a1) +M(a1a2)--.

COLUMN 9

Line 41, "enables" should read --enabled--.

UNITED STATES PATENT AND TRADEMARK OFFICE
CERTIFICATE OF CORRECTION

PATENT NO. : 4,799,110
DATED : January 17, 1989
INVENTOR(S) : KATSUTOSHI HISADA ET AL.  Page 2 of 3

It is certified that error appears in the above-identified patent and that said Letters Patent is hereby corrected as shown below:

COLUMN 10

Line 42, "702 AND" should read --702, AND--.
       Line 61, "and OR" should read --an OR--.

COLUMN 11

Line 22, "part" should read --parts--.
       Line 30, "e,ovs/Q/ output" should read --$\overline{Q}$ output--.

COLUMN 12

Line 3, "ar" should read --or--.
       Line 9, "right most" should read --rightmost--.

COLUMN 13

Line 13, "logic "1".The" should read --logic "1",the--.

COLUMN 14

Line 23, "register a 108" should read --register A 108--
       Line 47, "b 208" should read --B 208--.
       Line 51, "made-up code 2" should read
              --make-up code 2--.

COLUMN 15

Line 11, "and" should read --at--.
       Line 33, "so-" should read --stored--.
       Line 34, "tred" should be deleted.

UNITED STATES PATENT AND TRADEMARK OFFICE
CERTIFICATE OF CORRECTION

PATENT NO. : 4,799,110
DATED : January 17, 1989
INVENTOR(S) : KATSUTOSHI HISADA ET AL.   Page 3 of 3

It is certified that error appears in the above-identified patent and that said Letters Patent is hereby corrected as shown below:

COLUMN 17

Line 47, "M coding" should read --MR coding--.

COLUMN 18

Line 63, "IF" should read --If--.

COLUMN 19

Line 23, "real data" should read --read data--.

COLUMN 20

Line 60, "fist" should read --first--.

Signed and Sealed this

Twenty-seventh Day of August, 1991

Attest:

HARRY F. MANBECK, JR.

Attesting Officer

Commissioner of Patents and Trademarks